US012756991B2

(12) United States Patent
Dasher et al.

(10) Patent No.: US 12,756,991 B2
(45) Date of Patent: Oct. 6, 2026

(54) SYSTEM AND METHOD FOR CONTEXTUAL NOTIFICATION ROUTING

(71) Applicant: Adeia Guides Inc., San Jose, CA (US)

(72) Inventors: Charles Dasher, Lawrenceville, GA (US); Christopher Phillips, Hartwell, GA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 427 days.

(21) Appl. No.: 18/414,837

(22) Filed: Jan. 17, 2024

(65) Prior Publication Data

US 2025/0234164 A1 Jul. 17, 2025

(51) Int. Cl.
*H04W 4/12* (2009.01)
*H04M 1/72484* (2021.01)

(52) U.S. Cl.
CPC ......... *H04W 4/12* (2013.01); *H04M 1/72484* (2021.01)

(58) Field of Classification Search
CPC ............................ H04W 4/12; H04M 1/72484
See application file for complete search history.

(56) References Cited

U.S. PATENT DOCUMENTS 11,044,527 B2 6/2021 Skliba et al.
RE49,497 E 4/2023 Li et al.
2019/0082416 A1* 3/2019 DeLuca .............. H04W 68/005
2021/0266284 A1* 8/2021 U ......................... G06Q 10/109
2023/0115319 A1* 4/2023 Aher ..................... H04L 51/043 709/238
2023/0116657 A1* 4/2023 Aher ..................... H04L 67/025 709/224
2025/0232366 A1* 7/2025 Rule .................... G06Q 20/108

OTHER PUBLICATIONS

Apple, "User Notifications Push user-facing notifications to the user's device from a server, or generate them locally from your app" (https://developer.apple.com/documentation/usernotifications), 5 pages.

* cited by examiner

*Primary Examiner* — Congvan Tran
(74) *Attorney, Agent, or Firm* — HG Law LLP

(57) ABSTRACT

Systems and methods are provided for performing notification routing to user devices. Notification parameters are established for a notification account associated with a plurality of user devices. Real time device status, based on real-time user interaction with at least one of the devices, is received and used to determine routing parameters. Notification data is received from an application service for the notification account. A notification is generated based on the notification data, and one or more recipient user devices are identified from among the user devices associated with the notification account. The notification is routed to the identified recipient user devices to deliver the notification to the user devices for display to the user.

20 Claims, 17 Drawing Sheets

SYSTEM AND METHOD FOR CONTEXTUAL NOTIFICATION ROUTING

BACKGROUND

This disclosure is generally directed to systems and methods for notification routing to a user's devices based on real-time user interaction with one or more of the user's devices. In particular, systems and methods are provided herein that enable selective delivery of notifications to one or more of a user's devices based on the real-time context of how the user is presently using the devices. The real-time context may aid in determining whether the user devices are being presently used or not used, determining the purpose for which user devices are being presently used, and determining whether one of the user's devices is in proximity to another of user's devices, among other factors. In addition, the systems and methods enable customization of user preferences to provide greater user control for notification delivery to the user's devices.

SUMMARY

In today's digitally connected world, many individuals own at least two personal electronic devices ("user devices"), which may include a smartphone, a smart watch, a tablet computer, a laptop computer, a desktop computer, a smart home assistant, a smart TV, a streaming media player (SMP), a gaming system, and a VR/AR headset, among others. Some of these user devices may provide the user with notifications of things that are important to the user: birthdays, anniversaries, appointments, daily schedules, missed phone calls, voice mails, text communications, emails, news stories, and doorbell rings, among many other types of notifications. Some of the notifications that appear on these user devices are application specific, and therefore also application dependent, such that many types of user devices (e.g., some smart TVs, tablets, and laptop/desktop computers) may receive and display a notification if and only if the application originating the notification (e.g., a calendar application may originate a birthday notification because the calendar application hosts data about birthdays) is present on the user device. Still other user devices, such as smart watches, may be able to receive notifications even without the application installed, yet the display screens of these devices are small and often not capable of displaying certain types of media (e.g., media content having frame rates higher than 15 fps) that may be included as part of the notification. These designs give rise to multiple shortcomings relating to how, when, and where an owner of multiple user devices receives notifications about things that are important to them.

As an illustrative example, at present a user with multiple user devices, such as a smartphone, a smartwatch, a tablet computer, and a smart TV, may not be able to receive and view a notification on the smart TV when that notification relates to an incoming message in a messaging application. The reason for this shortcoming is that the application isn't, and frequently can't be, installed on the smart TV, and current messaging routing requires that the application be on the device to which the notification is routed. That same user may receive the notification on both the smartphone and the tablet computer if the application is installed on each respective user device. As for the smart watch, the user may receive the notification on the smart watch if the smart watch is paired with the user's smartphone, the application is installed on the smartphone, and the smart watch has an application installed that enables the display of notifications for the application on the smartphone.

Another shortcoming is found in the ability to customize the delivery and display of notifications. By way of example, a user may have a smartphone, a smartwatch, a tablet computer, and a laptop computer, all of which can receive and display notifications associated with an installed application. However, the user may prefer to receive notifications for this application on their smartphone during certain periods of the day, on their laptop computer during other periods of the day, and on their tablet computer during still other periods of the day. The user may also wish to receive notifications on their smart watch during parts of the day that overlaps portions of these other periods. To accomplish this, the user must access each user device separately to set up customizations for display of notifications. And, when the user is in situations or at locations that the existing customizations don't adequately meet the user's needs, the user must again access each user device separately to change the customizations for display of notifications. In addition to customization of notifications on each device, the user may also wish to customize the display of notifications according to the associated applications. To accomplish such customizations, the user must once again access each device separately to set up customizations for display of notifications for each individual application.

A need, therefore, exists to improve the process in which notifications are routed to a user's multiple user devices. To overcome such shortcomings, systems and methods that provide adaptive notification routing may be employed to take into account real-time contextual circumstances of the user devices, including the real-time status of multiple user devices, real-time user interactions with one or more of the user devices, and the proximity, or lack thereof, between user devices, among other factors. In addition, the systems and methods may advantageously route notifications to user devices based on notification parameters established by the user and the real-time device status, without the requirement that the application originating the notification be present on the user device. Also, the systems and methods may advantageously provide the user with centralized customizable control over certain aspects of the notification routing, thereby alleviating the need to configure each device individually.

To this end, systems and methods are presented for contextually and dynamically routing notifications to one or more of a user's devices. In some embodiments, before any notifications are routed, the user sets up a notification account with a notification service, associates user devices with the notification account, and establishes notification parameters, which define the user's preferences for routing notifications. These notification parameters form part of the basis for determining how notifications are routed to the user's devices. Once the notification account is set up with the user devices and the notification parameters, the notification service receives real-time device status data based on real-time user interaction with at least one of the user devices associated with the notification account. The notification service determines routing parameters based on the real-time device status data, and when notification data from an application service is received for the notification account, the notification service generates a notification based on the notification data. The notification service thereafter identifies, based on the notification parameters and the routing parameters, one or more recipient user devices, from among the user devices associated with the notification account, to which the notification is then sent.

Advantages are realized in the systems and methods described herein by using contextual and dynamic routing in combination with notification parameters established by the user. This combination advantageously provides the user with notification routing that is highly flexible, easy to configure from a single user device, and takes into account real-time user device interaction when determining to which of the user's devices a notification should be routed. With these advantages and other aspects of the described systems and methods herein, the notification routing of the present disclosure addresses the aforementioned shortcomings of existing notification services.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. The figures include.

DETAILED DESCRIPTION

Systems and methods are described herein for contextually routing notifications to one or more user devices using routing parameters, which are based on real-time user interaction with one or more of the user devices, and notification parameters, which are user-designated preferences and policies for routing notifications.

As described herein, the term "user device" and its variants refer to any electronic device with which a person, the user, may interact with to send, receive, view, edit, and/or store data, regardless of the form of the data. Variants of the term "user device" may be used to differentiate between different user devices for purposes of this disclosure, even though the user devices may otherwise be of identical construction. Such variants may include "primary user device", "secondary user device", "first user device", and "second user device", among others, and the use of a variant is not intended to indicate any differences between user devices unless such differences are expressly indicated herein.

Figure 1:
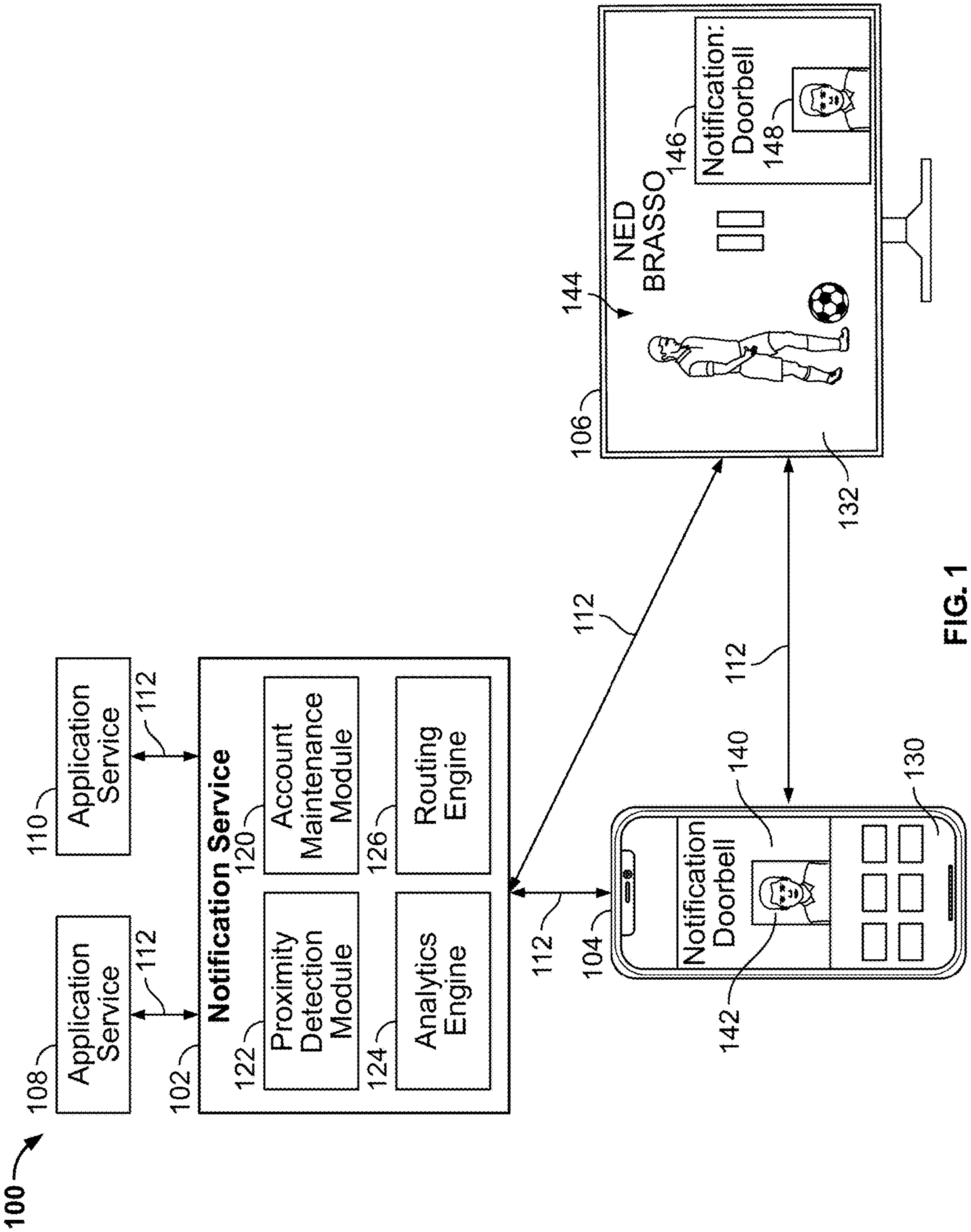
FIG. 1 schematically illustrates an example environment for a notification service and notification routing to one or more user devices.

Turning in detail to the drawings, FIG. 1 illustrates an example environment 100 for notification routing by a notification service 102. Using communication paths 112, the notification service 102 communicates with application services 108, 110 to receive notification data and with user devices 104, 106 to which the notification service 102 routes notifications for display to a user. In some embodiments, a communication path 112 may also be available between the user devices 104, 106 so that data relating to the notifications may be communicated between the user devices. In some embodiments, the notification service 102 may be implemented using a distributed computing model, such that the functionality of the notification service 102 may be performed by one or more distributed processing systems, including the application services 108, 110 or any other network-accessible computing platform. In such embodiments, the application services 108, 110 may directly rout notifications to the user devices 104, 106 as described herein.

The communication paths 112 enable communications between respective services and user devices. Each communication path 112 may separately or together include one or more distinct communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such communication paths. The communication paths 112, however, are shown as a single path to avoid overcomplicating the drawing.

In the context of the example environment 100, the user device 104 is the primary user device, and the user device 106 is a secondary user device. The user device 104 is the primary user device because it is the user device that the user interacts with and has in their presence most frequently. The user device 106 is a secondary user device because it is one of the user's devices and it is not the primary user device. In some embodiments, the user may designate a user device as the primary user device. In some embodiments, there may be no designated difference between user devices for a notification account, such that there is no designated primary user device and no designated secondary user devices associated with the user's notification account.

The notification service 102 includes various modules and engines which add functionality to the notification service 102, including the account maintenance module 120, the proximity detection module 122, the analytics engine 124, and the routing engine 126. The notification service 102 may also include other engines, modules, and/or sub-services that add functionality to notification routing. In some embodiments, the notification service 102 may provide options for the notifications to include user device control instructions with notifications that meet pre-determined criteria and/or with notifications that are being sent to predetermined user devices. In some embodiments, in which notifications are sandboxed, as described below, the user device control instructions included with notifications may be limited to only a few select functions, an example being functions to pause and play media content.

The account maintenance module 120 enables interaction between the user and the notification service 102 so that the user may set up a notification account and establish or select notification parameters. The notification account also serves as a link between the application services 108, 110 and the user devices 104, 106. In general, when an application is launched on one of the user devices 104, 106, the application communicates with the notification service 102 to receive a unique identifier for delivery of notifications for that application. In addition, the application also communicates with the related application service 108, 110 to provide the unique identifier supplied by the notification service 102. When the application service 108, 110 generates notification data for sending a notification to one of the user devices 104, 106, the notification data communicated to the notification service 102 references the unique identifier so that the notification service 102 may route the notification to the correct user device 104, 106.

The notification parameters provide the user with customization options for routing notifications to one or more of the user devices 104,106. In some embodiments, the notification parameters may be user-defined policies that determine how notifications from specified applications should be routed to designated user devices 104, 106. In some embodiments, the notification parameters may be time-based policies that are used to determine how notifications during a certain time of day or night should be routed to designated user devices. In general, the notification parameters available to the user, through the implementation of user-defined routing policies and other types of notification routing options, provide the user with the ability to make broad customizations for notification routing in advance of receiving notifications, the customizations being based on applications that originate notifications, user devices, geographical locations of the user, geographical locations of the user devices, geographical locations of the user devices with respect to other user devices associated with the notification account, and time of the notifications, among other possible customization options.

The proximity detection module 122 enables determining the location of the user devices 104, 106, and the determined location of each user device 104, 106 may be used to help determine the proximity of the user devices 104, 106 to each other. The notification service 102 may make notification routing determinations based on the location of one or both user devices 104, 106 and/or based on the proximity of the user devices 104, 106 to one another. The real-time device status data received by the notification service 102 from the user devices 104, 106 may be used by the proximity detection module 122 to determine the location of the respective user devices 104, 106. To this end, the real-time device status data may include geolocation data (e.g., geofencing) via a global positioning system, wireless local area network connection data (e.g., Wi-Fi networks), cellular network connection data (e.g., LTE, 4G, and/or 5G networks), and signal strength from an RF protocol such as Bluetooth, among others and without limitation. The real-time device status data may also be used to determine when any two user devices 104, 106 are in proximity to each other and/or connected to the same wireless networks. For example, the real-time device status data may indicate that the two user devices 104, 106 are in proximity to each other, by geolocation, and connected to the same wireless network. This may be an indication that both devices are presently located in the same room of a house. In another example, the real-time device status data may indicate that the two user devices 104, 106 are in somewhat close proximity to each other, with geolocation and wireless network connections placing the user devices 104, 106 in the same house, but with the Bluetooth signals between the two user devices 104, 106 being weak. This may be an indication that even though both user devices 104, 106 are in the same house, they are not within the same room. There are many other types and combinations of real-time device status data that may be used to determine the present location of a user device, and thus also the proximity of one user device to another user device. As such, the nature of the real-time device status data received by the notification service from user devices, for purposes of determining user device location, is not intended to be limiting.

As another example, referring to FIG. 1, the proximity detection module 122 may determine that the user device 104 is in the same room in a house as the user device 106. In this example, the real-time device status data from both user devices 104, 106 may indicate that they are connected to the same Wi-Fi network. Since the user device 104 is a smartphone, and the user device 106 is a smart TV, the proximity detection module 122 may determine that both user devices 104, 106 are located in the house where the smart TV is located. The real-time device status data from the user device 104, which may include geolocation data, may confirm the location of the house. Further, the real-time device status data from both user devices 104, 106 may indicate that they are both connected to the same Wi-Fi network. Finally, the real-time device status data may indicate that both user devices 104, 106 are detecting a strong Bluetooth signal from the other user device 104, 106, indicating that both user devices 104, 106 are likely in the same room within the house.

The analytics engine 124 also processes parts of the real-time user device status data received from the user devices. Whereas the proximity detection module 122 determines the location of the user devices 104, 106 from the real-time user device status data, the analytics engine 124 determines the operational status of the user devices 104, 106 from the real-time user device status data. To this end, the real-time user device status data may reflect real-time user interaction with one or both user devices 104, 106. In some embodiments, real-time user interaction may be determined by factors such how long the screen has been on (or off), touch interaction with a touch sensitive device, interaction with a specific application, among other indicators of a user's activity with a user device. In some embodiments, the real-time user device status data may indicate that the user is not presently using a user device 104, 106 (e.g. the display of the user device is off, the user device 104 has had no user input in several minutes, or if the user device 104 has a front-facing camera, the camera is receiving no light (e.g., the user device 104 is in a pocket, in a purse, or face-down on a table, and the like), among other similar indicators of present non-use), that the user is presently using a particular application on the user device 104, 106, or that the user device 104, 106 is presently displaying media content. In some embodiments, the real-time user device status data may also indicate that the user device 104 is in the user's possession, even if the user device 104 is not actively being used (e.g., the user device 104 was recently in motion). The type and nature of the real-time user device status data received from the user devices 104, 106 and analyzed by the analytics engine 124 are not intended to be limiting. Unlike analytics that attempt to analyze data from user devices in order to determine a user's habits, likes, dislikes, etc., one goal of the analytics engine 124 may be to determine what a user is doing right now in the present so that when notifications are routed, they may be routed to one of the user's user devices that is most probable for getting the notification seen by the user. Of course, as discussed herein, the real-time device status data is only one factor in determining to which user devices 104, 106 a notification should be routed.

Continuing with the example from above in which the user devices 104, 106 are determined to be located in the same house by the proximity detection module 122, the analytics engine 124 may determine the manner in which both user devices 104, 106 are presently being used, which will help determine how a notification from one of the application services 108, 110 is routed to most effectively be presented to the user. In this example, the analytics engine 124 may determine that the user is not actively using the user device 104, as the real-time device status data from the user device 106 indicates that the user device 104 has not moved for many minutes. The analytics engine 124 may also determine that the user is actively consuming media on the user device 106 (e.g., watching a TV show), as the real-time device data from the user device 106 indicates that media content is being actively displayed. Absent further real-time device status data relating to the proximity of the two user devices 104, 106, the analytics engine 124 may determine that a notification should be routed to both devices. However, if the real-time device status data indicates that the two user devices 104, 106 are located in the same room in the house, then the analytics engine 124 may determine that a notification should be routed to only the user device 106.

The routing engine 126 performs the notification routing for the notification service 102. The routing engine 126 receives notification data from the application services 108, 110, the notification data being identified for the user's notification account. From the notification data, the routing engine 126 generates a notification for routing to one or more of the user devices 104, 106. The routing engine 126 identifies which of the user devices 104, 106 are to be the recipients of the notification (also referred to herein as the recipient user devices) based on a combination of the notification parameters, which are defined by the user, and the routing parameters, which are based on the real-time device status data. Once the recipient user devices have been identified from among the user devices 104, 106, then the routing engine routes the notification to the recipient user devices. As shown in FIG. 1, both the user devices 104, 106 are recipient user devices. In some embodiments, the routed notification may also include instructions to the recipient user devices.

Continuing with the example from above, from the real-time device status data the proximity detection module 122 determines that the user devices 104, 106 are located in the same room in the same house, and the analytics engine 124 determines that the user is consuming content on the user device 106 and the user device 104 has been inactive for several minutes. The co-location of the user devices 104, 106 and the level of user engagement (or non-engagement) with each user device 104, 106 are used by the routing engine 126 to determine the routing parameters for routing the notification. The routing engine 126 determines which of the user devices 104, 106 are to be recipient user devices based on both the routing parameters and the notification parameters established by the user. This determination for notification routing by the routing engine 126, in some embodiments, may be made based on preexisting statistical analysis of data relating to users' interactions with multiple user devices, with the notification parameters set by the user acting as boundaries and definitive decision points for the routing engine 126. Thus, in some embodiments, the notification parameters may be given more weight than the routing parameters as the routing engine 126 identifies the recipient user devices from among the user devices 104, 106.

The routing engine 126 also generates the notification from the notification data received from the application service 108. The routing engine 126 may base the notification on substantial portions, or all, of the notification data when generating the notification, as appropriate. In some embodiments, the notification may include instructions to one or more of the recipient user devices. Such instructions may instruct one (or all) of the recipient user devices to perform an action, such as pausing media content playback when displaying the notification and resuming media content playback when the notification is dismissed by the user. In some embodiments, the instructed action may be to retrieve content from a network-connected source and incorporate that content into display of the notification. Other types of actions, without limitation, may be included as part of the notification routed to the recipient user devices. Once the notification service 102 has identified the recipient user devices and the notification has been generated, then the routing engine 126 routes the notification to the recipient devices.

As indicated above, the notification generated by the routing engine 126 is based on the notification data received from the application service 108, which may be any application service associated with an application on at least one of the user's user devices 104, 106. The application need not be on all the user's user devices, as the notification service 102 may still route the notification to a user device that does not have the application installed (e.g., user device 106 is a smart TV and therefore may not have a social media application installed, yet notifications from a social media application service may still be routed to the user device 106). In some embodiments, the application may not be installed on either of the user devices 104, 106, but in such embodiments, the application would be installed on a third user device associated with the user's notification account but not shown in FIG. 1. Further, such a third user device need not be in the possession or anywhere in the proximity of the user for purposes of the notification service 102 routing a notification to the user devices 104, 106.

The process of the notification service 102 routing notifications to the user devices 104, 106 may be further elucidated by another example, which is based on the application service 108 being a doorbell application. In this example, the user may be at home and have a doorbell camera installed at the front door of their home, and the doorbell camera is connected to a network for communications with the application service 108 and with one or more of the user devices 104, 106. The user device 104 may have the associated doorbell application installed, so that the user device 104 may communicate with the doorbell camera over the network. The doorbell camera may be configured to record and store video in response to predetermined conditions occurring, such as a visitor ringing the doorbell or motion being detected by the doorbell camera. The doorbell camera may be configured to store the video locally, on the device, or it may be configured to store the video on a remote device or server, or it may be configured to store the video with a remote cloud storage service. For purposes of this example, the doorbell camera video may be directly accessed by the application service 108 and by the user device 104 through the application installed on the user device 104, but the user device 106 does not have direct access to the doorbell camera video, as user device 106 does not have the doorbell application installed.

Continuing with the example, a visitor may ring the doorbell which triggers the doorbell camera to begin recording video of the visitor. The doorbell camera may alert the application service 108 about the doorbell ring and that video recording is being performed. The application service 108 may then communicate notification data to the notification service 102, and that notification data may include information about the doorbell ring (e.g., time of the ring, an identifier of the doorbell camera, and other pertinent information) along with a location identifier (e.g., a network address) indicating where the video recording is stored. The notification service 102 generates a notification based on the notification data and determines which of the user devices 104, 106 are to receive the notification based upon the notification parameters and the routing parameters. For purposes of this example, the proximity detection module 122 may determine, based on the most recent data received from each user device 104, 106, that the user device 104 is in close proximity to the user device 106, with both being in the same physical location and in the same room. The analytics engine 124 may determine, based on the most recent data received from each user device 104, 106, that the user device 104 has not been actively used by the user for more than 15 minutes and that the user device 106 is displaying media content, such as a television show. The notification service 102 therefore determines, based on analysis from the proximity detection module 122 and the analytics engine 124, that the notification is to be routed to both user devices 104, 106. In an alternate version of this example, the notification service 102 may determine that the notification is to be routed only to the user device 106, since that user device 106 is being actively used by the user and user device 104 is not.

In this example, the notification sent to each user device 104, 106 by the notification service 102 may be slightly different. The notification sent to the user device 104 may include the location identifier of the doorbell video along with instructions configured to instruct the user device 104 to retrieve a copy of the doorbell video using the location identifier. Since the user device 104 has the doorbell application installed, the user device 104 possesses the credentials for accessing the doorbell video using the location identifier. In comparison, the notification sent to the user device 106 may include instructions configured to instruct the user device 106 to retrieve a copy of the doorbell video from the user device 104, to pause playback of the media content when displaying the notification, and to resume playback of the media content when the notification is dismissed by the user (regardless of which user device 104, 106 is used to dismiss the notification). The user device 106, which does not have the doorbell application installed, does not possess the credentials for accessing the doorbell video directly from the doorbell camera using the location identifier. Alternatively, the notification sent to the user device 106 may include instructions to the user device 106 to receive the doorbell video from the user device 104 as streaming content. Upon receipt of the notification from the notification service 102, the user device 104 may automatically retrieve the doorbell video using the included location identifier and display the notification 140, including the doorbell video, on the display screen 130. Similarly, upon receipt of the notification from the notification service 102, the user device 106 may retrieve the doorbell video from the user device 104, pause playback of the media content 144 and display the notification 146, including the doorbell video 148, on the display screen 132. The automatic pause in playback of the media content 144 enables the user to focus on the notification 146 without missing any of the media content 144. When the user dismisses the notification 146, the user device 106 resumes playback of the media content.

In some embodiments, the instructions to the user device 104 may include stream casting instructions to the user device 106. For example, the routed notification may include instructions to the user device 104 that instruct the user device 104 to automatically stream-cast content associated with the notification to the user device 106. The user device 106 may be identified in the notification routed to the user device 104 by a device ID, a network address, or by other information sufficient to locate the user device 106 on a network for purposes of initiating the stream casting. The user device 104 may be instructed to retrieve the media content and transmit that media content to user device 106. As an alternative, the user device 104 may provide the user device 106 with a network address where the media content may be retrieved directly from a content source.

Figure 2:
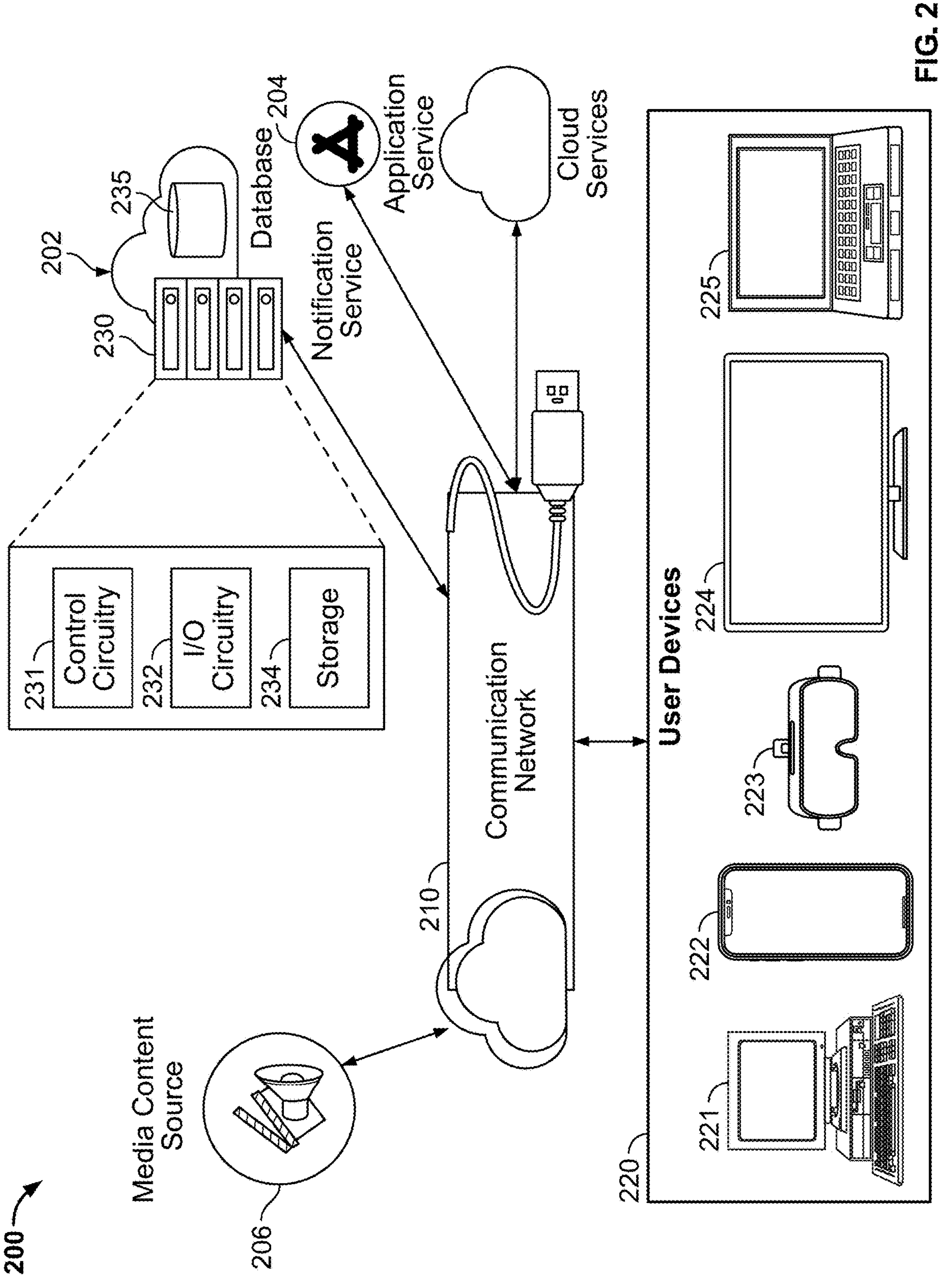
FIG. 2 shows an illustrative system for contextually routing notifications.

FIG. 2 shows an illustrative environment 200 in which a notification system 202, which is a host for a notification service, may operate for routing notifications to user devices 221-225, in accordance with some embodiments of this disclosure. Although the notification system 202 is shown in this environment 200 as a monolithic server, in some embodiments the notification system 202 may be structured as one or more virtual servers included as part of a cloud services platform, multiple distributed servers, a distributed computing environment across multiple programmable devices, or combinations thereof. The illustrative environment 200 may also include one or more application services 204, from which notification data originates, and one or more content source 206. The content source 206 may provide any type of content for use by the application services 204. The illustrative environment 200 also includes user devices 220 (e.g., devices 221-225) and/or any other suitable number and types of user devices capable of transmitting data via the communication network 210, including user devices which may not be configured to receive notifications, such as security cameras and doorbells, among others. Within this environment 200, the user devices 221-225, the notification service 202, and the application service 204 may communicate with each other and with other networked resources (e.g., cloud services, media content sources, etc.) via the communication network 210.

User devices 220 may include a desktop computer 221, a smartphone 222, VR/AR head-mounted display 223, a smart TV 224, and a laptop computer 225. The user devices 220 may also include additional devices that the user may interact with. Each of the user devices 220 is communicably connected to the communication network 210, by either a wired connection or a wireless connection, and the user devices 220 may receive notifications via this network connection. Although each of the user devices 220 include a display, user devices without a display may also be included as part of the user devices 220. For example, a smart home speaker may be one of the user devices, and such user devices, while not having a display, may provide notifications to the user via an audio announcement (e.g., speaking a calendar reminder). The user devices 220 may also include devices with displays that are not capable of displaying certain media content. For example, the user devices 220 may include a wearable device, such as a smart watch, with a display that isn't designed to show frame rates that are common to movies and other types of digital video media (e.g., frame rates of 15 fps and higher). Such wearable devices may still receive and display a notification from the notification service, and such wearable devices may display the notification with an indicator that media content is included as part of the notification. In some embodiments, such a wearable device may display the notification with prompt that enables the user to display the notification, including the media content, on another of the user devices 220 that is capable of displaying the media content.

In some embodiments, the notification system 202, or a sub-service thereof, may be executed at one or more of the control circuitry 231 of the notification server 230 and/or control circuitry of the user devices 220 and/or the control circuitry of other servers connected to the communication network 210. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Any device, equipment, etc. described herein may include control circuitry. The notification server 230 may be coupled to a database 235. In some embodiments, one or more data structures discussed herein may be stored at the database 235. The data structures may be maintained at or otherwise associated with the notification server 230, and/or at the storage 235, and/or at storage of one or more of the user devices 220, and/or at any other storage communicably coupled to the database 235 via the communication network 210. The communication network 210 may comprise one or more networks including the Internet, a mobile phone network, a mobile voice or data network (e.g., a 5G, 4G, or LTE network), cable network, public switched telephone network, or other types of communication network or combinations of communication networks. Although communication paths may not be shown between the user devices 220, the individual user devices 221-225 may communicate directly with each other via one or more communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. The user devices 220 may also communicate with each other through an indirect path the via communication network 210.

In some embodiments, a notification service may include a client/server application where only the client application resides on one or more user devices 220, and a server application resides on an external server. For example, a notification service may be implemented partially as a client application on control circuitry of one or more of the user devices 220 and partially on the notification server 230 as a server application running on control circuitry 231. The notification server 230 may be part of a local area network or may be part of a cloud computing environment accessed via the Internet. In a cloud computing environment, various types of computing services for performing searches on the Internet or informational databases, generating virtualized components, providing encoding/decoding capabilities, providing storage (e.g., for a database), or processing and parsing data (e.g., using algorithms, which may include machine learning algorithms) are provided by a collection of network-accessible computing and storage resources (e.g., the notification server 230), referred to as "the cloud." For example, the user devices 220 may include a cloud client that relies on the cloud computing capabilities from the notification system 202 to receive and process data for notification routing. When executed by the control circuitry 231 of the notification server 230 and/or another cloud accessible resource, a notification service, or parts thereof, may instruct the control circuitry 231 and/or accessible resources to perform processing tasks for notification routing to the user devices 220 and facilitate execution of the various processes.

In some embodiments, the notification server 230 may include control circuitry 231 and storage 234 (e.g., RAM, ROM, hard disk, removable disk, etc.). The storage 234 may store one or more databases. The notification server 230 may also include input/output (I/O) circuitry 232 that may provide protocol for communicating data, device information, or other data, over a local area network (LAN) or wide area network (WAN), and/or other content and data to and from the control circuitry 231, which may include processing circuitry, and the storage 234. The control circuitry 231 may be used to send and receive commands, requests, and other suitable data using the I/O circuitry 232, which may comprise I/O circuitry. The I/O circuitry 232 may connect the control circuitry 231 to one or more communication paths.

The control circuitry 231 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, the control circuitry 231 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 231 executes instructions for an emulation system application stored in memory (e.g., the storage 234). Although not shown, memory may be an electronic storage device provided as the storage 234 that is part of the respective control circuitry 231.

Figure 3:
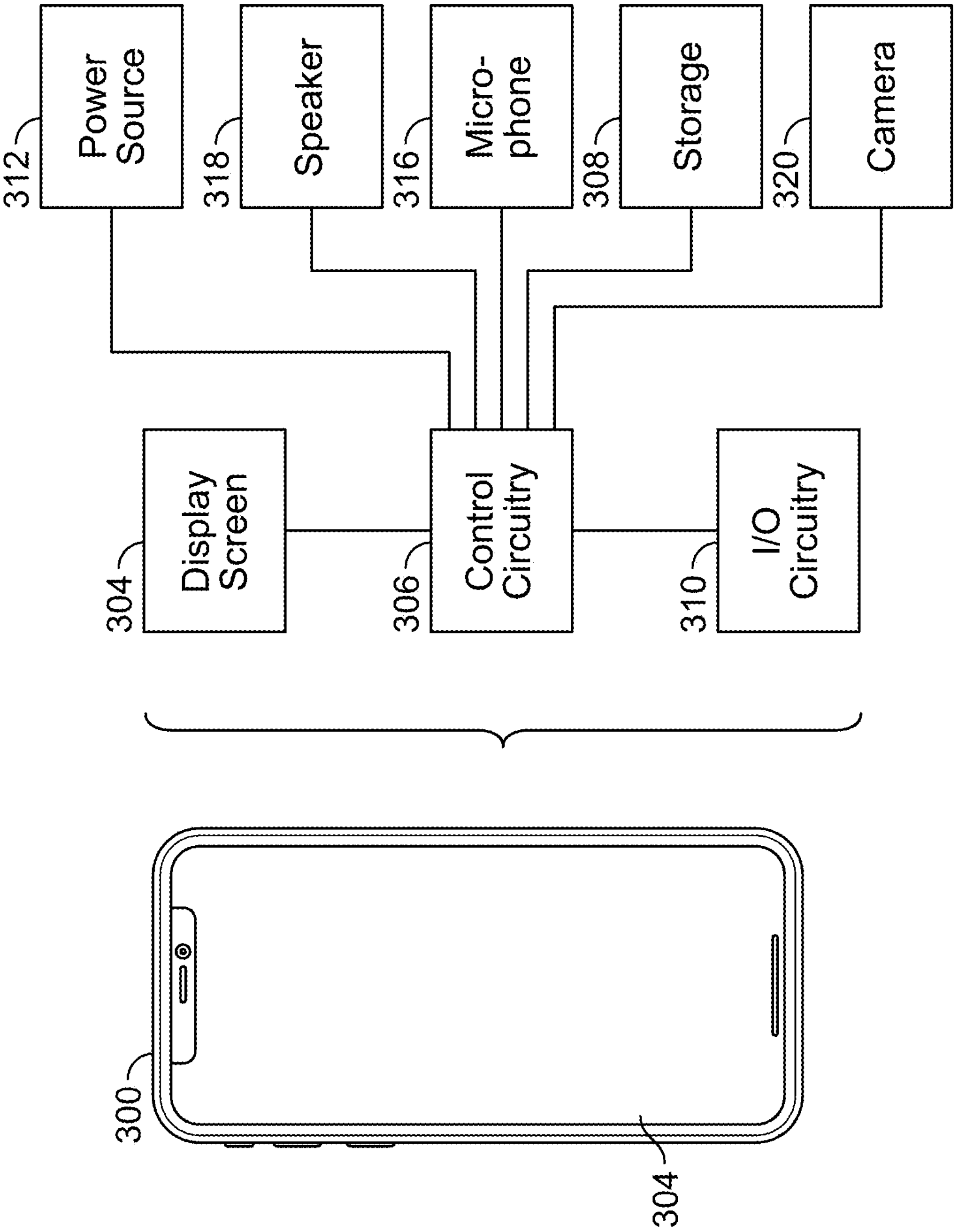
FIG. 3 shows a first illustrative user device for receiving contextually routed notifications.

FIG. 3 shows a first illustrative user device 300 for interacting with a notification service and receiving routed notifications. The user device 300 also includes components in accordance with some embodiments of this disclosure, such that the user device 300 shown is not intended to be limiting. In some embodiments, the user device 300 may be a smartphone, a tablet computer, a personal computer, and other similar programmable user devices having a display. In some embodiments, the user device 300 may be a smart home assistant, and therefore may not include a display. In some embodiments, the user device 300 may be a smart watch with a display. The user device 300 as shown includes a display 304, control circuitry 306, storage 308, input/output (I/O) circuitry 310, and a power source 312. The control circuitry 306 may include a processor (not shown). The user device 300 may also include one or more integrated components such as a microphone 316, a speaker 318, and/or a camera 320.

In some embodiments, as indicated above, some or all of the notification service processes may be performed by the control circuitry 306. In such embodiments, the user device 300 may effectively route a notification to itself for display on the display screen 304.

The user device 300 may access, transmit, receive, and/or retrieve content and data via the I/O circuitry 310. As an illustrative example, the I/O circuitry 310 may be used by the control circuitry 306 to access content (e.g., broadcast programming, on-demand programming, Internet content, content available over a local area network (LAN) or wide area network (WAN), and/or other content) and data. The control circuitry 306 may be used to send and receive commands, requests, and other data using the I/O circuitry 310. The I/O circuitry 310 may communicably couple the control circuitry 306 to many other devices, servers, content sources, application services, among other types of connected computing devices and services.

The display 304 is depicted as a generalized embodiment of a display device. The display 304 may be, for example, a standard touch sensitive display incorporated into a smartphone, a standard laptop display, or a standard desktop computer display, among other types of displays. Some non-limiting examples of a display include a tensor display, a light field display, a volumetric display, a multi-layer display, an LCD display, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable display equipment.

The control circuitry 306 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. The control circuitry 306 may include video processing circuitry (e.g., integrated and/or a discrete graphics processor). In some embodiments, the control circuitry 306 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 306 executes instructions for a notification service, or parts thereof, stored in memory (e.g., the storage 308). Specifically, the control circuitry 306 may be instructed by a notification service, or parts thereof, to perform any of the functions described herein. In some implementations, processing or actions performed by the control circuitry 306 may be based on instructions received from a notification service or parts thereof.

The control circuitry 306 may include or be communicatively coupled to video generating circuitry and tuning circuitry, such as one or more analog tuners, one or more H.265 decoders or any other suitable digital decoding circuitry, high-definition tuners, or any other suitable tuning or video circuits or combinations of such circuits. Conversion circuitry (e.g., for converting over-the-air, analog, or digital signals to MPEG signals for storage) may also be provided. The control circuitry 306 may also include scaler circuitry for upconverting and down-converting content into a suitable output format for display. The control circuitry 306 may also include or be communicatively coupled to digital-to-analog converter circuitry and analog-to-digital converter circuitry for converting between digital and analog signals. The tuning and generating circuitry may be used by the user device 300 to receive and to display, to play, and/or to record content. The tuning and generating circuitry may also be used to receive video generating data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 308 is provided or supplemented by a separate device from the user device 300, the tuning and generating circuitry (including multiple tuners) may be associated with the storage 308.

The storage 308 may be any circuitry or device for storing electronic data, such as random-access memory, solid state devices, quantum storage devices, hard disk drives, non-volatile memory or any other suitable fixed or removable storage devices, and/or any combination of the same. The storage 308 may be an electronic storage device that is part of the respective control circuitry 306. As referred to herein, the phrase "electronic storage device" or "storage device" should be understood to mean any circuitry or device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage 308 may store data defining images for display by the user device 300. The storage 308 may be used to store various types of content described herein. Nonvolatile memory may also be used (e.g., to launch a boot-up routine and other instructions). Cloud-based storage may be used to supplement the storage 308 or instead of the storage 308.

The control circuitry 306 may include or be coupled to the I/O circuitry 310, which is suitable for communicating with a server or other network accessible devices, a table or database server, or other networks or servers. The instructions for carrying out the above-mentioned functionality may be stored on a server. Such communications may involve the Internet or any other suitable communication networks. In addition, the I/O circuitry 310 may include circuitry that enables peer-to-peer communication of user devices, or communication of user devices in locations remote from each other. In some embodiments, the I/O circuitry 310 may include circuitry that communicatively couples the user device 300 to one or more other devices over a network. For example, the I/O circuitry 310 may include a network adaptor and associated circuitry. The I/O circuitry 310 may include wires and/or busses for connecting to a physical network port (e.g., an ethernet port, a wireless WiFi port, cellular communication port, or any other type of suitable physical port). Although communication paths are not shown between the different user devices 220 of FIG. 3, any of the described devices and equipment may communicate directly or indirectly with each other via one or more communication paths and/or communication networks including short-range, point-to-point communication paths, such as USB cables, IEEE 1394 cables, wireless paths (e.g., Bluetooth, infrared, IEEE 802-11x, etc.), or other short-range communication via wired or wireless paths. For example, the I/O circuitry 310 may include a Bluetooth network adaptor.

The power source 312 may include a source of power or an interface for coupling to an external power source, or combinations thereof, without limitation. While not shown, the power source 316 may be coupled to other components of the user device 300. Some non-limiting examples of a power source 312 include a battery, solar generator, and/or a wired power source.

The microphone 316 and the speaker 318 may be included as integrated equipment with other elements of the user device 300. The microphone 316 and speaker 318 of the user device 300 may also be included as integrated equipment with other elements of the user device 300. In some embodiments, the microphone 316 and the speaker 318 may be external to the user device 300 as stand-alone units. An audio component of videos and other audio content may be played through the speaker 318 (or external headphones or other external audio device). The camera 320 may be any suitable still or video camera integrated with the user device 300. In some embodiments, the camera 320 may be external to the user device 300 as a stand-alone unit. In some embodiments, the camera 320 may be a digital camera that includes a charge-coupled device (CCD) and/or a complementary metal-oxide semiconductor (CMOS) image sensor. In some embodiments, the camera 320 may be an analog camera that converts still analogue images to digital images via the control circuitry 306 or via a video card (not shown).

Figure 4:
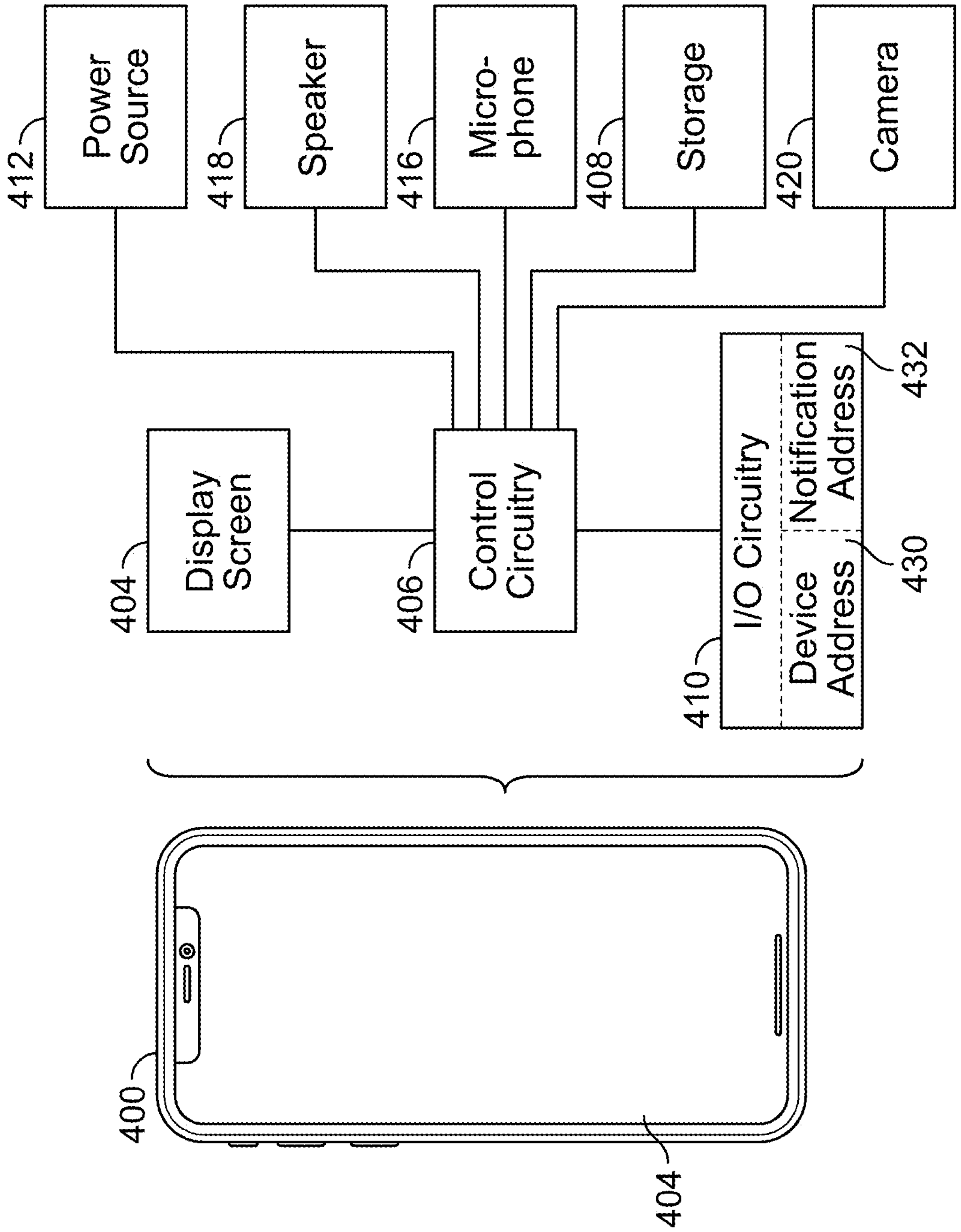
FIG. 4 shows a second illustrative user device for receiving contextually routed notifications.

FIG. 4 shows a second illustrative user device 400 for interacting with a notification service and receiving routed notifications. The user device 400 also includes components in accordance with some embodiments of this disclosure, such that the user device 400 shown is not intended to be limiting. In some embodiments, the user device 400 may be a smartphone, a tablet computer, a personal computer, and other similar programmable user devices having a display. In some embodiments, the user device 400 may be a smart home assistant, and therefore may not include a display. In some embodiments, the user device 400 may be a smart watch with a display. The user device 400 as shown includes a display 404, control circuitry 406, storage 408, input/output (I/O) circuitry 410, and a power source 412. The control circuitry 406 may include a processor (not shown). The user device 400 may also include one or more integrated components such as a microphone 416, a speaker 418, and/or a camera 420. Except as otherwise discussed herein, the components of the user device 400 are similar, in both construct and function, to the components of the user device 300 of FIG. 3.

The I/O circuitry 410 may be configured so that the user device 400 has two network addresses. In some embodiments, the first network address may be a device address 430, and this device address 430 may used by the control circuitry 406 for most regular network communications. In such embodiments, the second network address may be a notification address 432, and this notification address 432 may be used exclusively for notifications routed to the user device 400 from the notification service. In some embodiments, the I/O circuitry 410 may include two physical network adapters, each being associated with a unique network address, one for the device address 430 and the other for the notification address 432. In some embodiments, the I/O circuitry 410 may include a multi-homed network adaptor that may be associated with multiple network addresses to enable each of the device address 430 and the notification address 432 to be distinct. In still other embodiments, the I/O circuitry 410 may assign different network ports to the device address 430 and the notification address 432. In such an embodiment, the device address 430 and the notification address 432 may use the same base network address, but the I/O circuitry 410 may be configured to only receive notifications through a designated network port, whereas the device address 430 may use a range of ports that does not include the network port designated for notifications.

Having a separate notification address 432 may help the control circuitry 406 of the user device 400 to place all data received relating to notifications into a digital sandbox, thus enhancing the digital security profile of the user device 400. In addition, by placing all data received for notification purposes into a digital sandbox, the notifications routed to the user device 400 may have access to systems and resources existing on the user device 400, but with a substantially reduced risk of regular operations of the user device 400 being disrupted, whether that disruption is unintentional or otherwise. The concept, design, and implementation of digital sandboxes are known in the art of computing, and therefore implementation of the digital sandbox with the notification address 432 are not discussed in further detail herein. In some embodiments, the separate notification address 432 may be effectuated by the control circuitry 406 and/or by a combination of the control circuitry 406 and the I/O circuitry 410.

Placing notifications within a digital sandbox by the control circuitry 406 of the user device 400 enables some distinct advantages for the communication, processing, and display of notifications. For example, in some embodiments in which the user device 400 receives a routed notification via the I/O circuitry 410, the control circuitry 406 may process the routed notification along with any associated content, whether the content originates from the notification service, the application service, or from some other network-connected source, separately from other processes active on the user device 400. In some embodiments, the display screen 404 may be used to display notifications to the user by overlaying the notification on the screen and the then-current content being displayed to the user. Such an overlay may take up only a portion of the screen, and such partial overlays are referred to herein as a "notification island" (see, for example, 146 in FIG. 1). The appearance of such notification islands may be controlled by the user, as the control circuitry 406 may be configured so that the user may adjust the size, opacity, color, and positioning, among other aspects, of the notification island and any notifications included therein. Customizations of the appearance and location of the notification island may be effectuated without compromising the digital sandbox used for the notifications.

In some embodiments, the notification island may be dynamically controlled by the control circuitry 406 to adjust the size, opacity, and/or position of the notification island based on the user's real-time interaction with the user device 400. For example, if the user is not currently and actively using the user device 400, the notification island might be in a larger window and opaque. In contrast, if the user is presently and actively using the user device 400, the notification island, when displaying a routed notification, might be smaller and more transparent, and thereby less distracting to the user. Further, when the user interacts with the notification island that is already presented in a more transparent and smaller frame, or if the user disengages with the user device 400, the control circuitry 406 may automatically enlarge the notification island and reduce the transparency of the notification island to bring more attention to the notification. In some embodiments, if the user is consuming media content, when the notification island is presented to display the notification, the control circuitry 406 may be configured to automatically pause the media content so that the user may give attention to the notification and not miss any of the media content. Pausing media content may be particularly advantageous when the user is consuming multimedia content on a user device 400, and most especially if the user device 400 is a smart TV. In some embodiments, the user device 400 may display a notification without pausing playback of media content on the user device 400 or on any other associated user device.

In some embodiments, by assigning the notification address 432 for notification use exclusively, the notification service, application services, and other content services providing data incorporated into the routing and display of notifications may communicate directly with the user device 400 while still enabling the user device 400 to remain secure from inadvertent problems and/or unwanted intrusions arising from notification processing. In some embodiments, the notification address 432 may be used to stream content directly to the user device 400 for display in the notification island. The streamed content may originate from the notification service, the application service, a third-party media content source, another of the user's devices, and/or any other streaming-capable source. In some embodiments, the user device 400 may initiate the content streaming by accessing the media content via the I/O circuitry 410. In some embodiments, the control circuitry 406 may be configured to enable other devices and/or services to connect to the user device 400 via the notification address 432 and use the notification island as an external display for stream casting content.

In some embodiments, having a dedicated notification address 432 available on a user device, along with an accompanying notification island, may be used to enable a guest mode for notifications on user devices such as smart TVs. In some embodiments, a guest mode may also be made available on other types of user devices which may be shared with another user. Smart TVs are particularly well-suited for inclusion of a guest mode, as the owner of the smart TV may want to enable house guests to receive and display notifications, particularly important notifications, the smart TV while the owner and the house guest consume content on the smart TV together, e.g., while watching a movie, playing video games, and the like.

Guest mode may be enabled by the control circuitry of the smart TV sharing the notification address with a house guest's user device, e.g., a smartphone, for purposes of notification routing. The control circuitry of the house guest's user device, when presented with the opportunity to access the smart tv via guest mode, may be configured to associate the notification address of the smart TV with the house guest's notification account maintained by the notification service. In some embodiments, the notification service may enable this guest mode association upon request. In some embodiments, the notification service may enable this guest mode association upon verification of physical proximity between the house guest's user device with the smart TV. In some embodiments, the notification service may remove this guest mode association upon receiving real-time device status data from the house guest's user device that the house guest's user device and the smart TV are no longer in proximity, i.e., the house guest has left the house where the smart TV is located.

When guest mode is enabled on a smart TV, or any other type of user device, and a guest user device associates the smart TV with the guest's notification account, then notifications routed to the guest user device may also be routed to the notification island of the smart TV. Since many users may not want every single notification routed to their personal user device to be displayed to others on a smart TV, in some embodiments the notification service may allow users to configure their notification parameters so select the types of notifications that should be routed to other devices when a device providing guest mode access is associated with the notification account. The notification service thus enables a user a high degree of customization, through notification policy management implemented via the notification parameters, for routing notifications to a user device that is associated with a notification account through guest mode. For example, a user can customize routing of notifications from specific applications (e.g., home security apps and the like) so that such notifications are routed to the smart TV (or the notification island of a smart TV). Additionally, users may also customize routing by specifying routing for a subset of notifications from a specific application. For example, the user may elect to have only notifications related to motion detection from a doorbell camera routed to the notification island, while notifications related to general account management from the application that controls the doorbell camera, such as billing notifications, may not be routed or have delayed routing.

Figure 5:
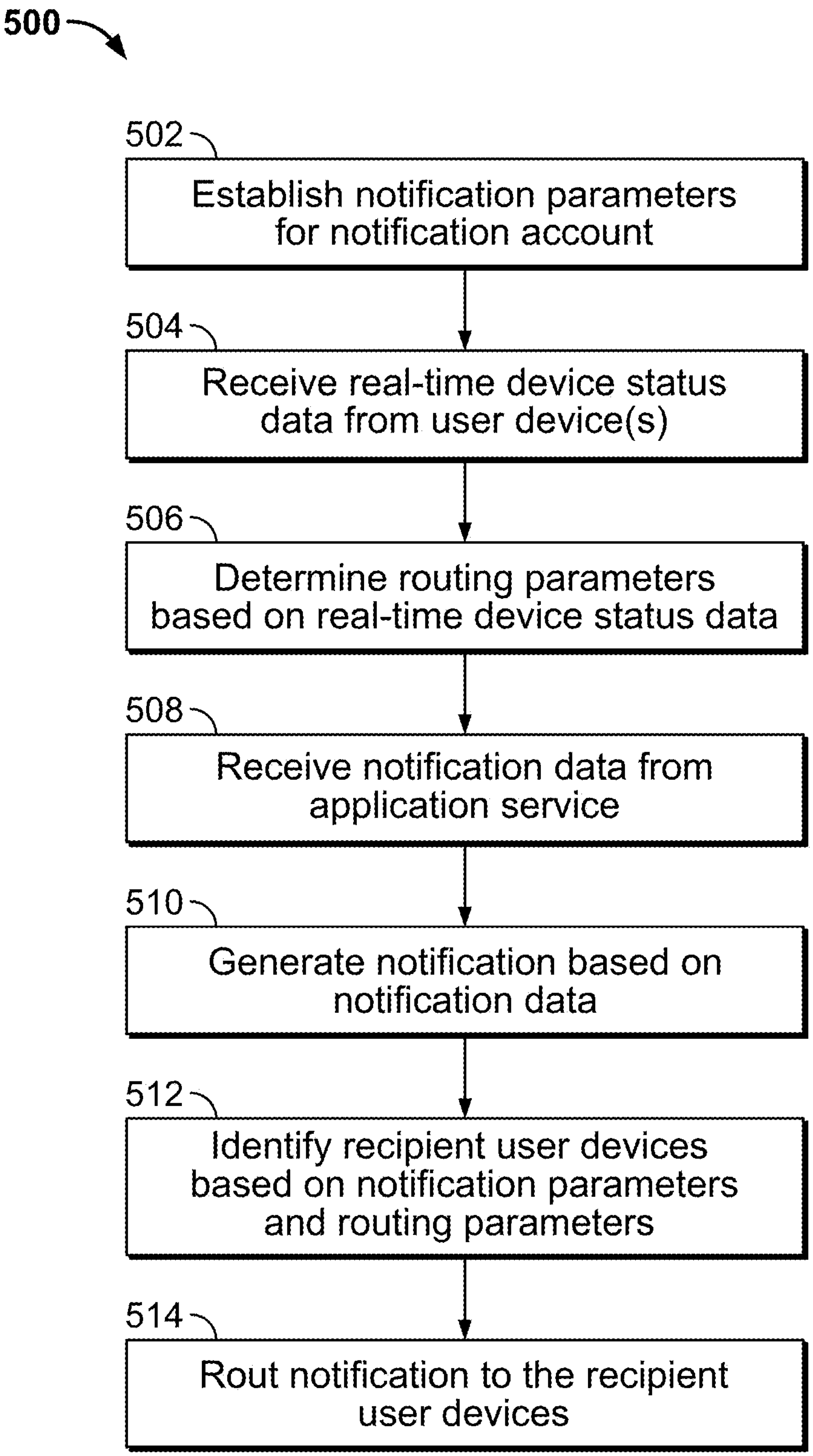
FIG. 5 shows a flowchart of illustrative steps involved in contextually routing notifications.

FIG. 5 shows a flowchart illustrating the steps of a process 500 for enabling contextual notification routing. The process 500 may be implemented using the notification service discussed herein and the systems on which the notification service is implemented. The notification service may be implemented as part of a stand-alone server, as multiple distributed servers, as one or more virtual servers that are included as part of a cloud services platform, and as part of a distributed computing environment using multiple servers (virtual and/or non-virtual) and/or multiple computing devices. One or more actions of the process may be incorporated into or combined with one or more actions of any other process or embodiments described herein. At step 502, the notification service establishes notification parameters for a notification account set up by a user. The user may set up the notification account and have a plurality of user devices associated with the notification account for delivery of notifications. The user may also select notification parameters for the notification account, and the notification parameters may indicate the user's preferences for routing notifications to the user devices associated with the notification account. At step 504, the notification service receives real-time device status data from at least one of the user devices associated with the notification account. As discussed above, the real-time device status data may include the location of a user device, the proximity of one user device to another user device (both user devices being associated with the notification account), and/or the operational status of a user device.

At step 506, the notification service determines routing parameters based on the real-time device status data. As indicated above, the routing parameters play a role in determining how the notification service routes a notification is to be routed to the associated user devices. At step 508, the notification service receives notification data from an application service, and at step 510, the notification service generates a notification based on the notification data. At step 512, the notification service identifies recipient user devices based on the notification parameters and the routing parameters. The recipient user devices are one or more of the user devices associated with the notification account that are to receive the notification. At step 514, the notification service routes the notification to the recipient user devices. As discussed herein, the notification may include instructions to one or more of the recipient user devices to perform specified actions, such as retrieving media content, streaming media content, receiving streamed media content, dismissing the notification upon the occurrence of a specified event, among many other possible actions.

Figure 6:
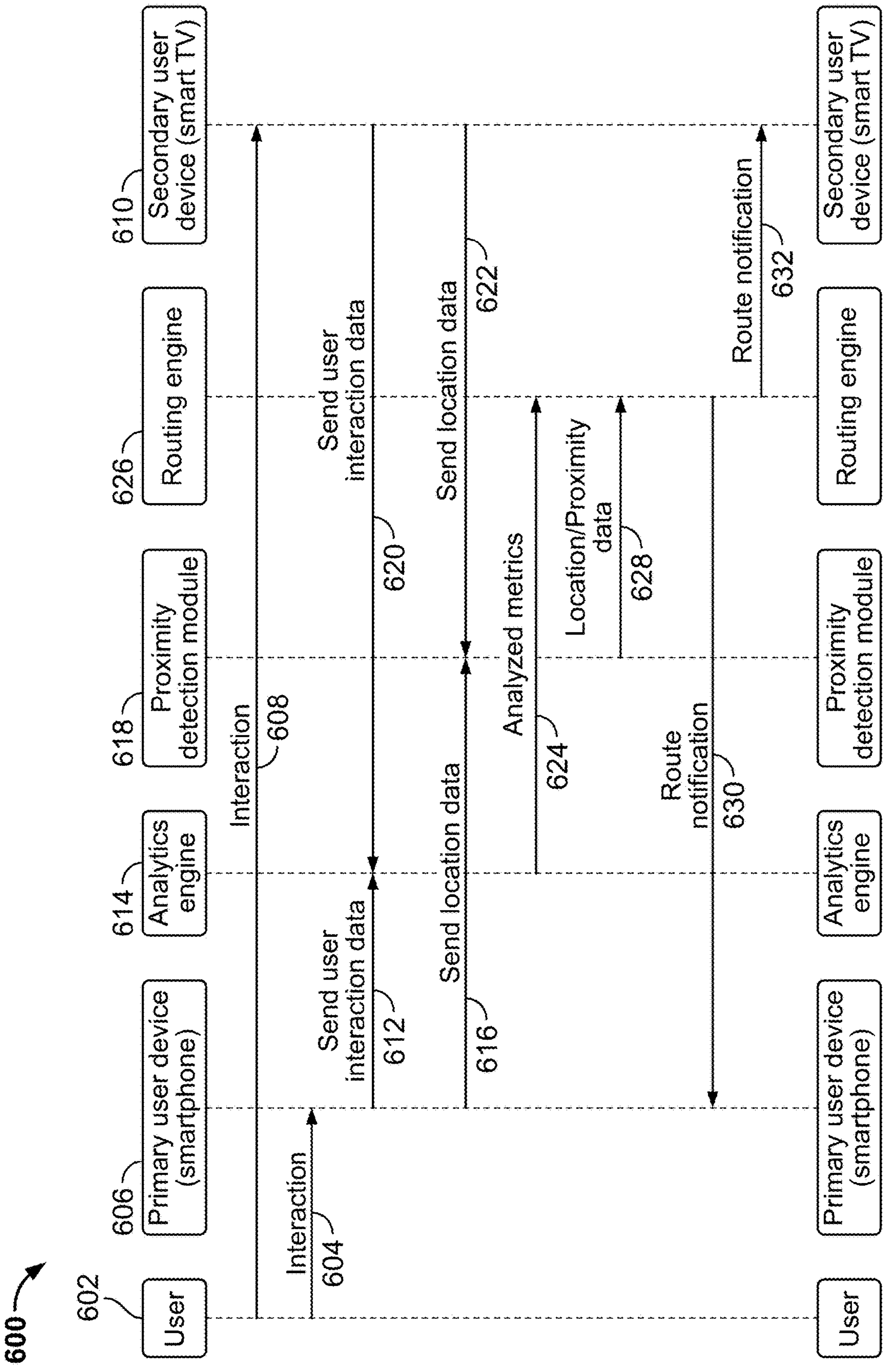
FIG. 6 shows a sequence diagram illustrating a first sequence of steps that may be incorporated as part of contextual notification routing in accordance with some embodiments of this disclosure.

FIGS. 6-18 are sequence diagrams illustrating one or more sequences that may be performed to effectuate notification routing. Each of these sequences may be implemented using the notification service discussed herein and the systems for implementing the notification service. One or more sequences may be incorporated into or combined with one or more other sequences or embodiments described herein. The sequence 600 of FIG. 6 starts with the user 602 interacting 604 with the primary user device 606, which in this instance may be a smartphone, and interacting 608 with the secondary user device 610, which in this instance may be a smart TV. These interactions 604, 608 may not be simultaneous or even contemporaneous. However, each interaction 604, 608 results in real-time device status data being generated by each user device 606, 610, and the real-time device status data is sent to the notification service at the time of generation. The real-time device status data may include both real-time user interaction data, to be processed by the analytics engine, and real-time location data, to be processed by the proximity detector module. The interaction 604 results in the primary user device 606 sending user interaction data 612 to the analytics engine 614 and sending user device location data 616 to the proximity detection module 618. Likewise, the interaction 608 results in the secondary user device 610 sending user interaction data 620 to the analytics engine 614 and sending user device location data 622 to the proximity detection module 618. Real-time device status data may be received regularly by the analytics engine 614 and the proximity detection module 618 from one or both user devices 606, 610, depending upon the level of user interaction with and changes to the location of each respective user device 606, 610.

The analytics engine 614 analyzes the user interaction data 612, 620 to generate analytics metrics, and the analytics engine 614 provides the analytics metrics 624 to the routing engine 626. Similarly, the proximity detection module 618 analyzes the location data 616, 622 to determine the respective locations of the primary user device 606 and the secondary user device 610, and the proximity detection module 618 provides the locations to the routing engine 626. Based on the analytics metrics and the locations, the routing engine 626 determines routing parameters for a current notification. The routing engine 626 determines whether one or both devices are to receive the current notification based on the analytics metrics (indicating the user's current level of engagement with each respective user device 606, 610) and the locations (which also indicates the proximity of the user devices 606, 610 to each other) combined with any user preferences or policies established by notification parameters. The last steps of the sequence 600 are the routing engine 626 routing the notification 630 to the primary user device 606 and routing the notification 632 to the secondary user device 610. In circumstances when user engagement is high with the primary user device 606, the notification engine 626 may route the notification only to the primary user device 606. Conversely, in circumstances when user engagement is low or absent from the primary user device 606, and when the secondary user devices 610 has indicia of being actively used, then the notification engine 626 may route the notification only to the secondary user device 610. Alternatively, the notification engine 626 may determine in either circumstance that the notification should be routed to both user devices 606, 610.

Figure 7:
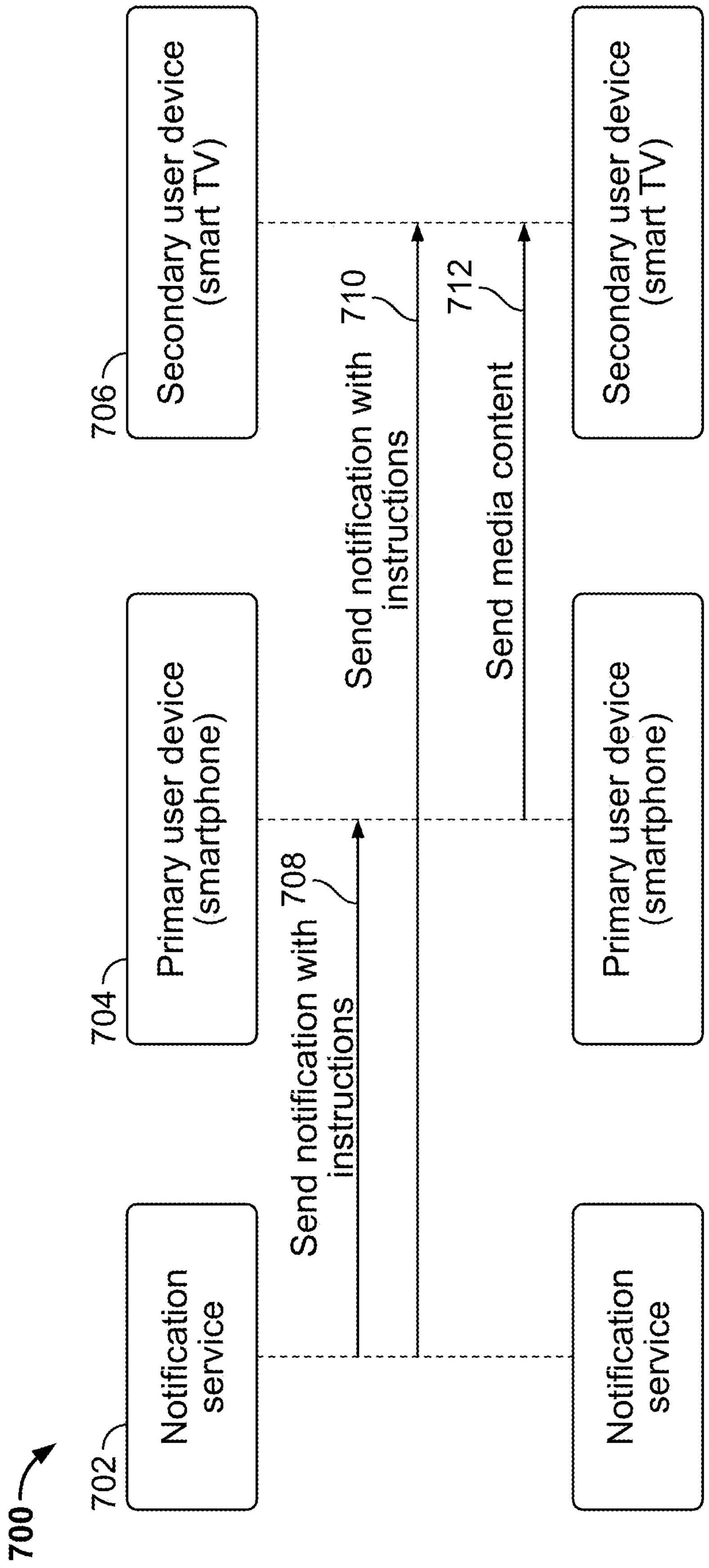
FIG. 7 shows a sequence diagram illustrating a second sequence of steps that may be incorporated as part of contextual notification routing in accordance with some embodiments of this disclosure.

The sequence 700 of FIG. 7 illustrates how the notification service 702 may deliver a notification that includes media content to both the primary user device 704, which in this instance may be a smartphone, and the secondary user device 706, which in this instance may be a smart TV, in accordance with some embodiments. The sequence 700 may occur during the routing step of the notification routing process, and in this sequence 700, the notification service 702 routes a notification to each of the primary user device 704 and the secondary user device 706. In this sequence 700, the notification routed to each user device 704, 706 includes instructions specific to the respective user device 704, 706. The notification service 702 routes a first version of the notification with instructions 708 to the primary user device 704, and the notification service 702 routes a second version of the notification with instructions 710 to the secondary user device 706. In this sequence 700, the notification routed to the primary user device 704 includes a location identifier for media content and instructions configured to instruct the primary user device 704 to retrieve the media content using the location identifier and to send the media content 712 to the secondary user device 706. In some embodiments, the instructions to the secondary user device 706 may be configured to instruct the secondary user device 706 to permit the primary user device 704 to initiate streaming of the media content with the secondary user device 706. In some embodiments, the instructions to the primary user device 704 may identify the secondary user device 706 by a device identifier associated with the user's notification account. In such embodiments, the primary user device 704 may verify the device identifier with the notification account to identify the secondary user device 706 and determine the current network location of the secondary user device 706 for purposes of communicating media content or other data to the secondary user device 706. In some embodiments, the device identifier may identify the location of a notification island associated with the secondary user device 706.

The notification routed to the secondary user device 706 may include instructions configured to instruct the secondary user device 706 to receive the media content from the primary user device 704 and to incorporate the media content into the notification when the notification is displayed. Through this sequence 700, the secondary user device 706 may display a notification with media content even if the secondary user device 706 cannot access the media content directly from the media source using the location identifier (e.g., access to the media content requires credentials associated with an application that is not installed on the secondary media device 706). In some embodiments, the media content may be received and stored by the secondary user device 706 prior to displaying the notification. In some embodiments, the primary user device 704 may stream the media content to the secondary user device 706 for immediate display as part of the notification.

Figure 8:
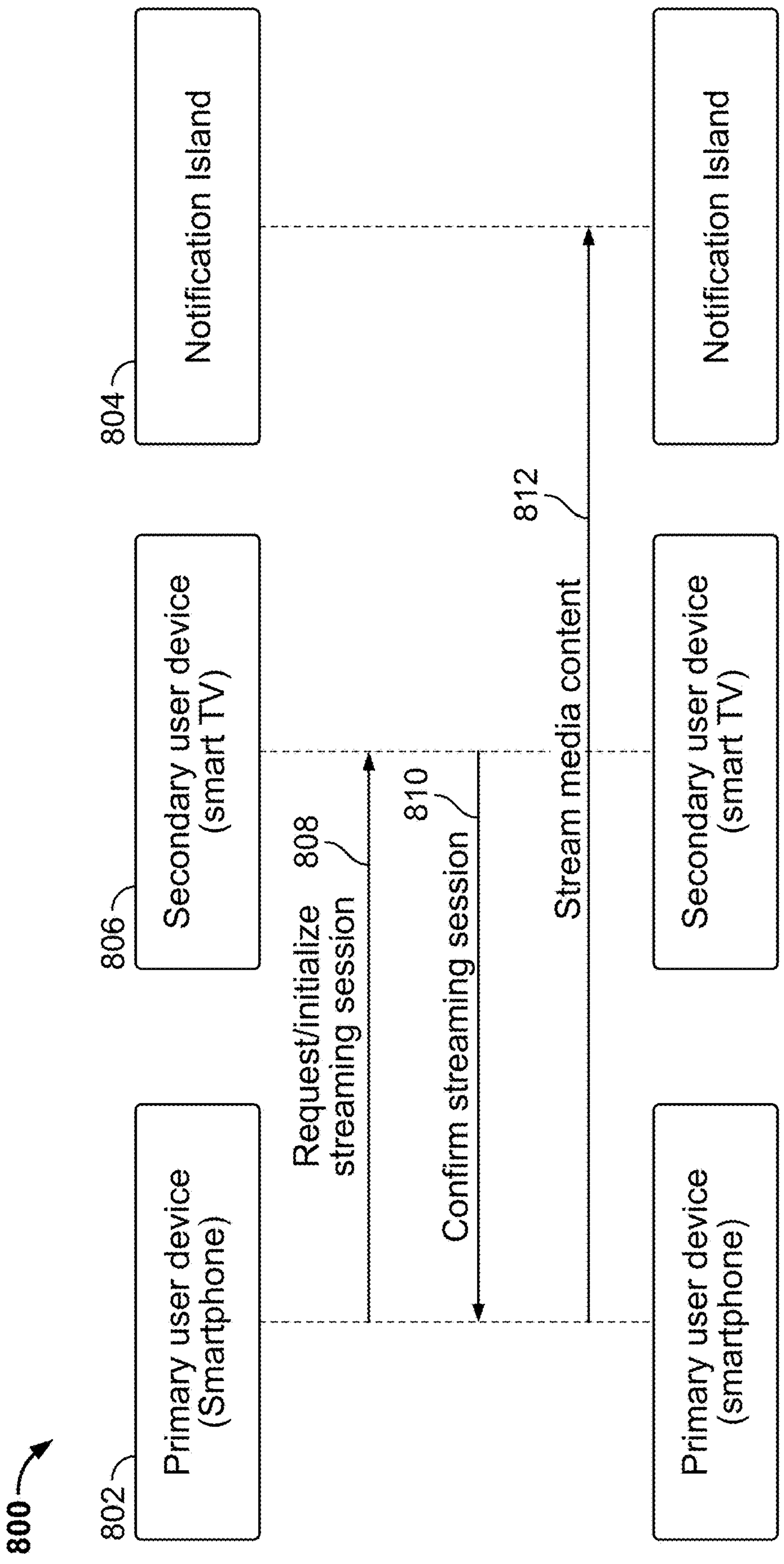
FIG. 8 shows a sequence diagram illustrating a third sequence of steps that may be incorporated as part of contextual notification routing in accordance with some embodiments of this disclosure.

The sequence 800 of FIG. 8 illustrates how a primary user device 802 may stream media content directly to the notification island 804 of a secondary user device 806 in accordance with some embodiments. This sequence 800 may occur after each of the primary user device 802 and the secondary user device 806 has received a notification from the notification service. The notification to the primary user device 802 may include instructions configured to instruct the primary user device 802 to stream media content to the secondary user device 806, and the notification to the secondary user device 806 may include instructions configured to instruct the secondary user device 806 to receive streamed media content from the primary user device 802 for display as part of a notification within the sandbox of the notification island 804. In this sequence 800, the primary user device 802 sends a request to initiate a streaming session 808 to the secondary user device 808, and specifically to initiate the streaming session to the notification island 804. The secondary user device 806 accepts the streaming session 810 with the primary user device 802, after which the primary user device 802 may begin streaming the media content to the notification island 804. The streamed media content is then displayed with a notification within the sandbox of the notification island 804 on the secondary user device 806.

Figure 9:
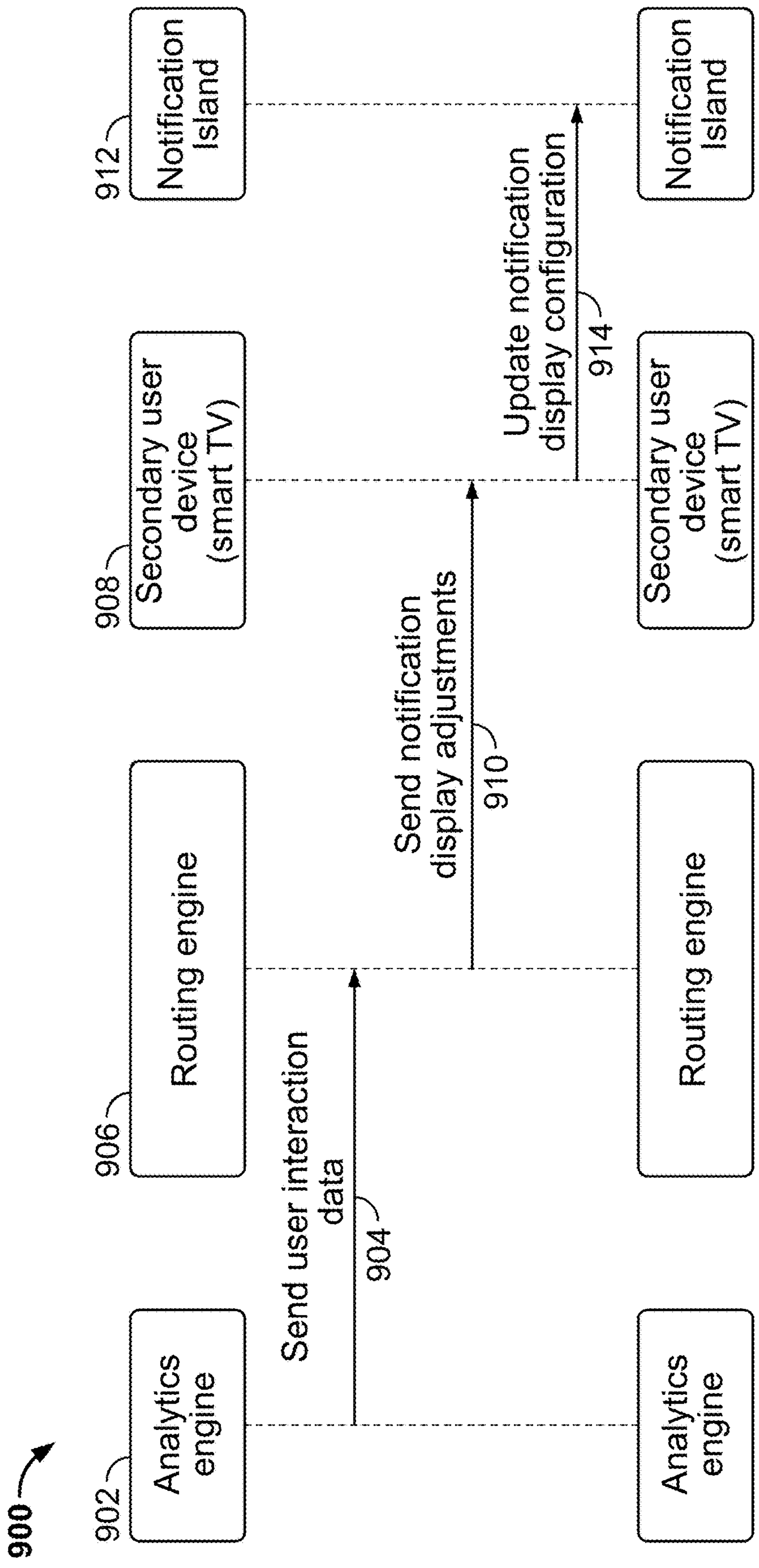
FIG. 9 shows a sequence diagram illustrating a fourth sequence of steps that may be incorporated as part of contextual notification routing in accordance with some embodiments of this disclosure.

The sequence 900 of FIG. 9 illustrates how the display of a notification to the user may be modified in response to user interaction data that details real-time user interaction with a user device. This sequence 900 may occur at any time during the process of the notification service collecting real-time user interaction data. Following receipt and analysis of real-time user interaction data by the analytics engine 902, the analytics engine 902 sends analyzed user interaction data 904 to the routing engine 906. Based on the analyzed user interaction data, the routing engine 906 may determine that the presentation of the display of a notification should be adjusted on the secondary user device 908. The adjustments may be to expand, contract, or otherwise change the notification presentation to make a notification more or less visible to the user. For example, if a high level of user engagement with the secondary user device 908 is detected, the presentation of the notification may be changed to appear less prominent, and therefore less distracting. As another example, if a high-level of user engagement with the primary user device is detected, then the presentation of the notification on the secondary user device 908 may be changed to appear more prominent. Some features of the notification display that may be changed to increase/decrease prominence of a notification include size, shape, and opacity of the notification. The routing engine 906 sends notification display adjustments 910 to the secondary user device 908. In some embodiments, the routing engine 906 may include the notification display adjustments 910 as part of a notification sent to the secondary user device 908. In this sequence 900, the secondary user device 908 is configured with a notification island 912, so that following receipt of the notification display adjustments 910, the secondary user device 908 updates the notification display configuration 914 with the notification island 912. In some embodiments, the routing engine 906 may designate adjustments to the notification display configuration 914 to be applied to a single notification. In some embodiments, the routing engine 906 may designate adjustments to the notification display configuration 914 to be applicable to all notifications until further adjustments are made or until specified conditions are met (e.g., proximity, or lack of proximity, with another user device, time of day, a specified application is used, etc.).

Figure 10:
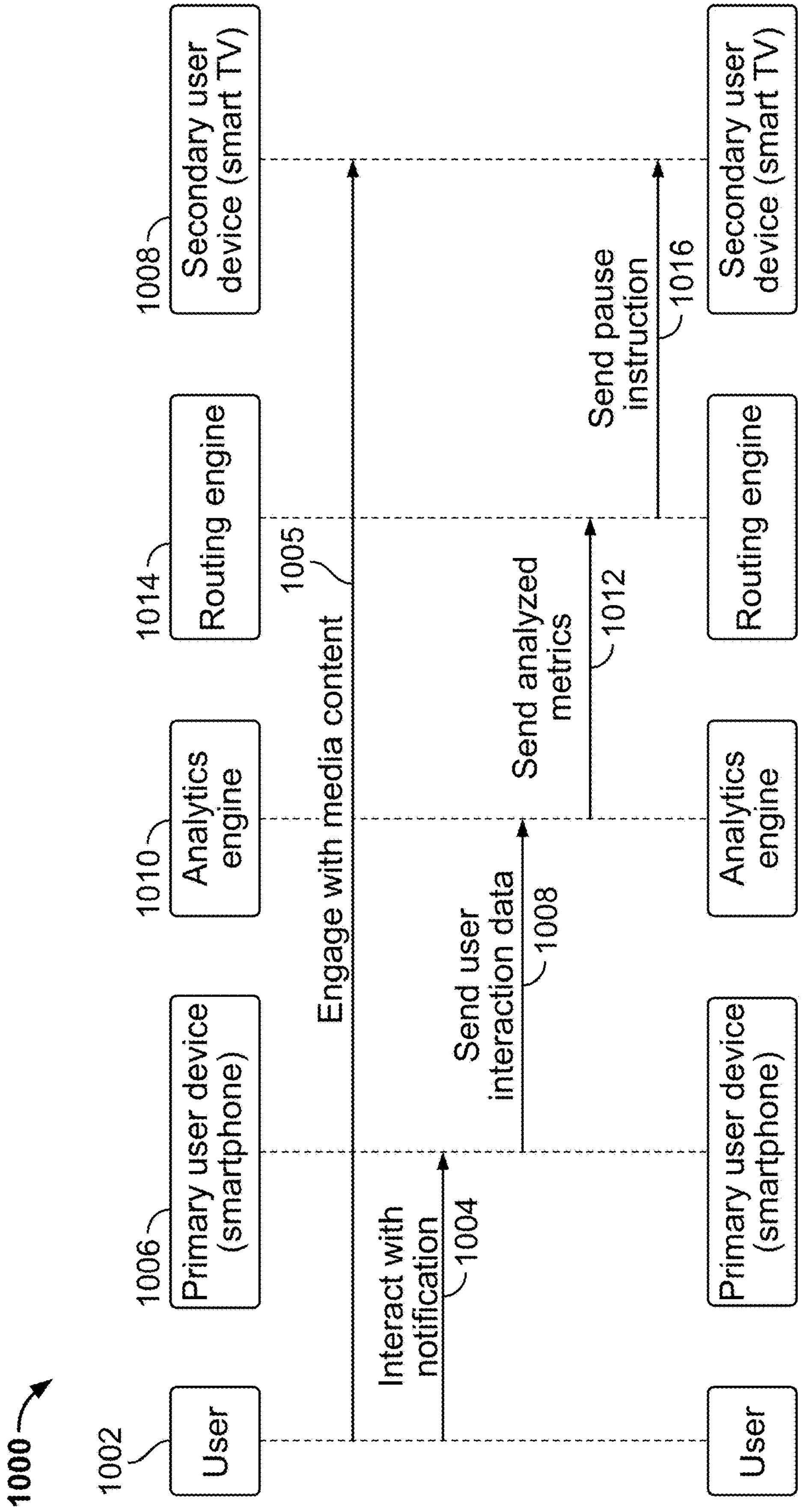
FIG. 10 shows a sequence diagram illustrating a fifth sequence of steps that may be incorporated as part of contextual notification routing in accordance with some embodiments of this disclosure.

The sequence 1000 of FIG. 10 illustrates how the display of a notification to the user may be modified in response to present user interaction data with a user device. This sequence 1000 may occur at any time during the process of the notification service routing notifications to the user devices. The sequence 1000 starts with the user 1002 interacting with a notification 1004, or an application to which a just-delivered notification relates, on the primary user device 1006, which in this instance may be a smartphone, while consuming media content on the secondary user device 1008, which in this instance may be a smart TV. For purposes of this sequence 1000, the analytics engine 1010 may have previously received user interaction data from the secondary user device 1008 indicating that the user 1002 is engaged with media content 1005 displayed on the secondary user device 1008. The interaction 1004 with the notification of the related application on the primary user device 1006 results in the primary user device 1006 sending user interaction data 1008 to the analytics engine 1010. The analytics engine 1010 analyzes the user interaction data 1008 to generate analytics metrics, and the analytics engine 1010 provides the analytics metrics 1012 to the routing engine 1014.

Based on the analytics metrics (and location data that may also be available), the routing engine 1014 may determine that while the user is interacting with the notification 1004, the media content being displayed on the secondary user device 1008 should be paused. The routing engine 1014 may therefore send a pause instruction 1016 to the secondary user device 1008. The pause instruction 1016 may be incorporated into an updated notification if a notification is currently being displayed by the secondary user device 1008. In some embodiments, the routing engine 1014 may be configured to send a null notification to the secondary user device 1008, the null notification including instructions configured to instruct the secondary user device 1008 to perform an action. In such embodiments, the null notification does not incorporate any notification data. In some embodiments that enable null notifications, the null notifications may be limited to those user devices that have implemented a sandboxed notification island.

In embodiments with the content pausing feature shown in FIG. 10, if a user 1002 receives an important email or social media notification and starts interacting with the primary user device 1006, the user 1002 may attend to the notification without missing any part of the media content being displayed on the secondary user device 1008. In some embodiments, the user 1002 may interact with the notification on the primary user device 1006, and the primary user device 1006 may be configured to enable the user 1002 to control the content pausing feature on the secondary user device 1008. Such control may be enabled through the real-time device status data sent from the primary user device 1006 to the analytics engine 1010. For example, a dismissal of the notification may cause real-time device status data to include the dismissal, and when the routing engine 1014 receives an indication of the dismissal, the routing engine 1014 may send instructions to the secondary user device 1008 to cause playback of the media to resume. In some embodiments, the primary user device 1002 may be configured such that a double tap or a swipe up on the displayed notification serves as the indication that the routing engine 1014 should send instructions to the secondary user device 1008 to cause playback of the media to resume. In other embodiments, other types of user gestures or interactions with the primary user device 1002 may serve this same function.

Figure 11:
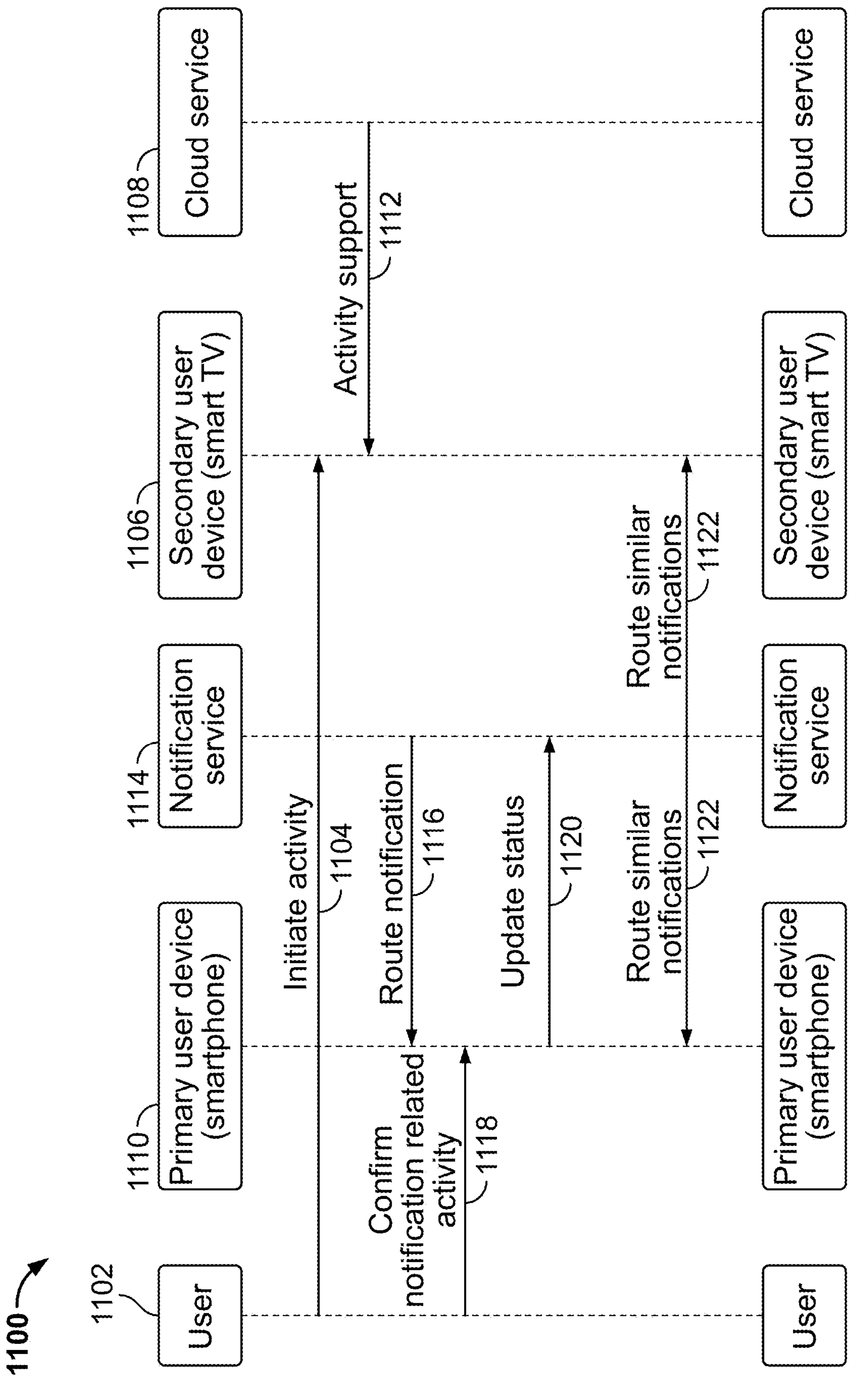
FIG. 11 shows a sequence diagram illustrating a sixth sequence of steps that may be incorporated as part of contextual notification routing in accordance with some embodiments of this disclosure.

The sequence 1100 of FIG. 11 illustrates how the user may customize delivery of notifications while involved with an activity on a user device. This sequence 1100 may occur at any time during the process of the notification service collecting real-time user interaction data. The sequence 1100 begins with the user 1102 initiating an activity 1104 on the secondary user device 1106. The activity 1104 may be viewing media content (such as a sporting event, or a movie as part of a watch party) from a media service, playing an online game that interacts with a game service, or viewing a movie as part of a watch party service. For purposes of this sequence 1100, the service, regardless of the nature of the activity, is referred to as a cloud service 1108, and the primary user device 1110 is in close proximity to the secondary user device 1106. The cloud service 1108 provides activity support (e.g., as a media content streaming service, as a game server, etc.) to the secondary user device 1106 with the activity Through real-time device status data, the notification service 1114 is aware that the user 1102 is involved with the activity on the secondary user device 1106 and that the user 1102 is not presently interacting with the primary user device 1110. When the notification service 1114 routes a notification 1116 to the primary user device 1110 and the notification is displayed on the primary user device 1110, the notification may prompt the user to indicate whether the notification is related to the ongoing activity on the secondary user device 1108. The user 1102 responds to the prompt on the primary user device 1110 to confirm the notification is related to the activity 1118, and the user's response may be communicated to the notification service 1114 via an update to the real-time device status data 1120 sent to the notification service 1114. In circumstances when the user indicates that the notification 1116 is not related to the activity, further notifications from the same application service will be routed according to the user's established notification parameters. In circumstances when the user indicates that the notification 1116 is related to the activity, the notification service may route 1122 all further notifications from the same application service to both the primary user device 1110 and the secondary user device 1106 for the duration of the activity. In some embodiments, the user may be provided with the option to route all similar notifications from the same application service only to the secondary user device 1106. Similarity between notifications may be determined according to the application service providing the notification, the subject matter of the notification, or messaging from a particular person or group of persons, and the like. When the activity has concluded, the notification service may revert notification routing to the user's established notification parameters.

Through implementation of this sequence 1100, with minimal effort the user may elect receive notifications on the secondary user device 1106 when the notifications are related to the activity displayed on the secondary user device 1106. Moreover, this change in the routing of notifications may be temporary and therefore may automatically revert to the user's established notification parameters without requiring the user to actively revert the parameters.

Figure 12:
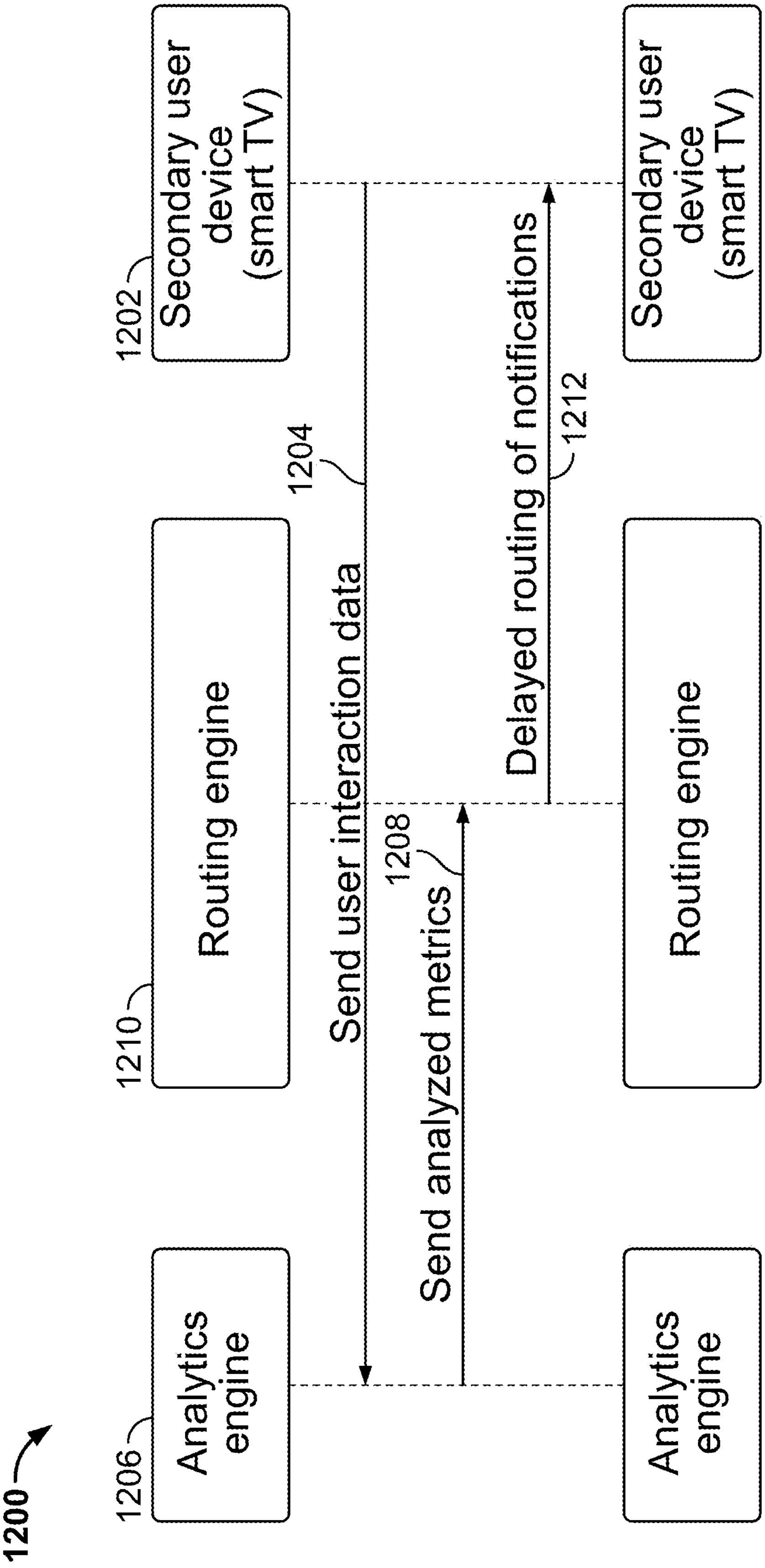
FIG. 12 shows a sequence diagram illustrating a seventh sequence of steps that may be incorporated as part of contextual notification routing in accordance with some embodiments of this disclosure.

The sequence 1200 of FIG. 12 illustrates how notifications may be assigned a priority for purposes of notification routing when the user is involved in an activity with a user device. This sequence 1200 may occur at any time during the process of the notification service collecting real-time user interaction data. The sequence 1200 begins with the secondary user device 1202, which in this instance may be a smart TV, sending user interaction data 1204 to the analytics engine 1206. For purposes of this sequence 1200, the user interaction data indicates that the user is consuming media content on the secondary user device 1202. The analytics engine 1206 analyzes the user interaction data 1204 and sends analyzed metrics 1208 to the routing engine 1210. From the analyzed metrics 1208, the routing engine 1210 may delay routing of certain notifications based on the activity displayed on the secondary user device 1202 and the state of that activity. For example, if the user is watching a movie on the secondary user device 1202 and the routing engine 1210 receives notification data that is not time-sensitive, the routing engine 1210 may delay routing notifications 1212 to the secondary user device 1202 until the user has finished watching the movie. Alternatively, the routing engine 1210 may route the notification to the secondary user device 1202 if the movie is paused for more than a predetermined duration of time (e.g., one minute, five minutes, etc.). In some embodiments, the routing engine 1210 may route a notification to the secondary user device 1202 opportunistically, such as during commercials, ad-breaks, credit rolls, or in between episodes of a tv show. However, the routing engine 1210 may immediately route notifications to the secondary user device 1202 for display to the user if the notifications are determined to be time sensitive, such as notifications relating to a doorbell ring, messages from a favorited contact, or a calendar event that is about to occur. In some embodiments, a routed notification for such time-sensitive notifications may also include instructions to the secondary user device 1202 to pause playback of the media content.

Figure 13:
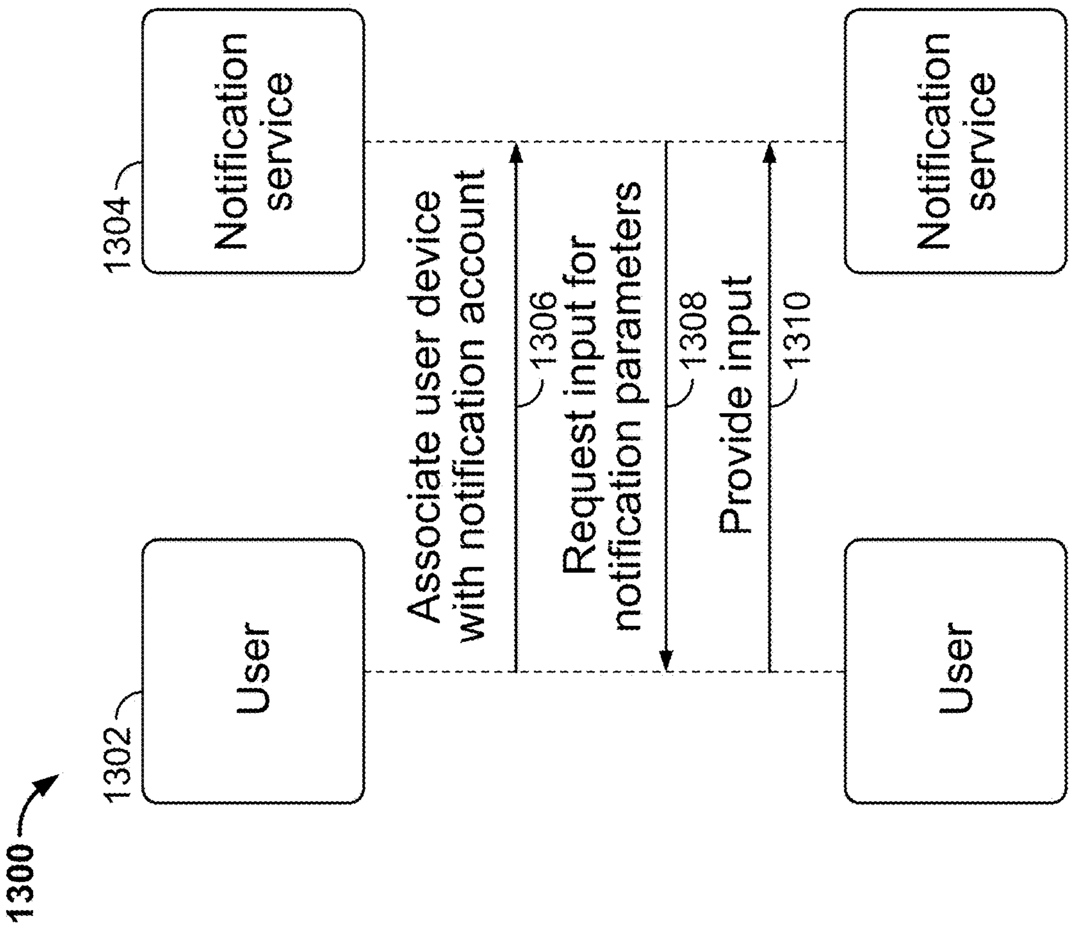
FIG. 13 shows a sequence diagram illustrating an eighth sequence of steps that may be incorporated as part of contextual notification routing in accordance with some embodiments of this disclosure.

The sequence 1300 of FIG. 13 illustrates how a user 1302 may establish notification parameters with the notification service 1304. This sequence 1300 may occur when the user 1302 first establishes a notification account, when the user 1302 is associating a new user device with a notification account, or at any time the user wishes to make changes to their preferred notification parameters. The sequence 1300 begins with the user 1302 associating a user device 1306 with the user's notification account. The user 1302 may perform this association with the user device 1306 itself or by using another computing device to interact with the notification service 1304. Following association of the user device 1306. The notification service 1304 requests input from the user to establish notification parameters for the newly associated user device. The request may be in the form of a series of options that may be selected by check-boxes, a series of questions prompting the user for answers, a combination of checkboxes and questions, or any other method that might be used for obtaining the user's input for notification routing. In some embodiments, the requested input 1308 may ask the user 1302 if they wish to receive notifications on the newly associated user device or on a primary user device when the two devices are in close proximity.

Figure 14:
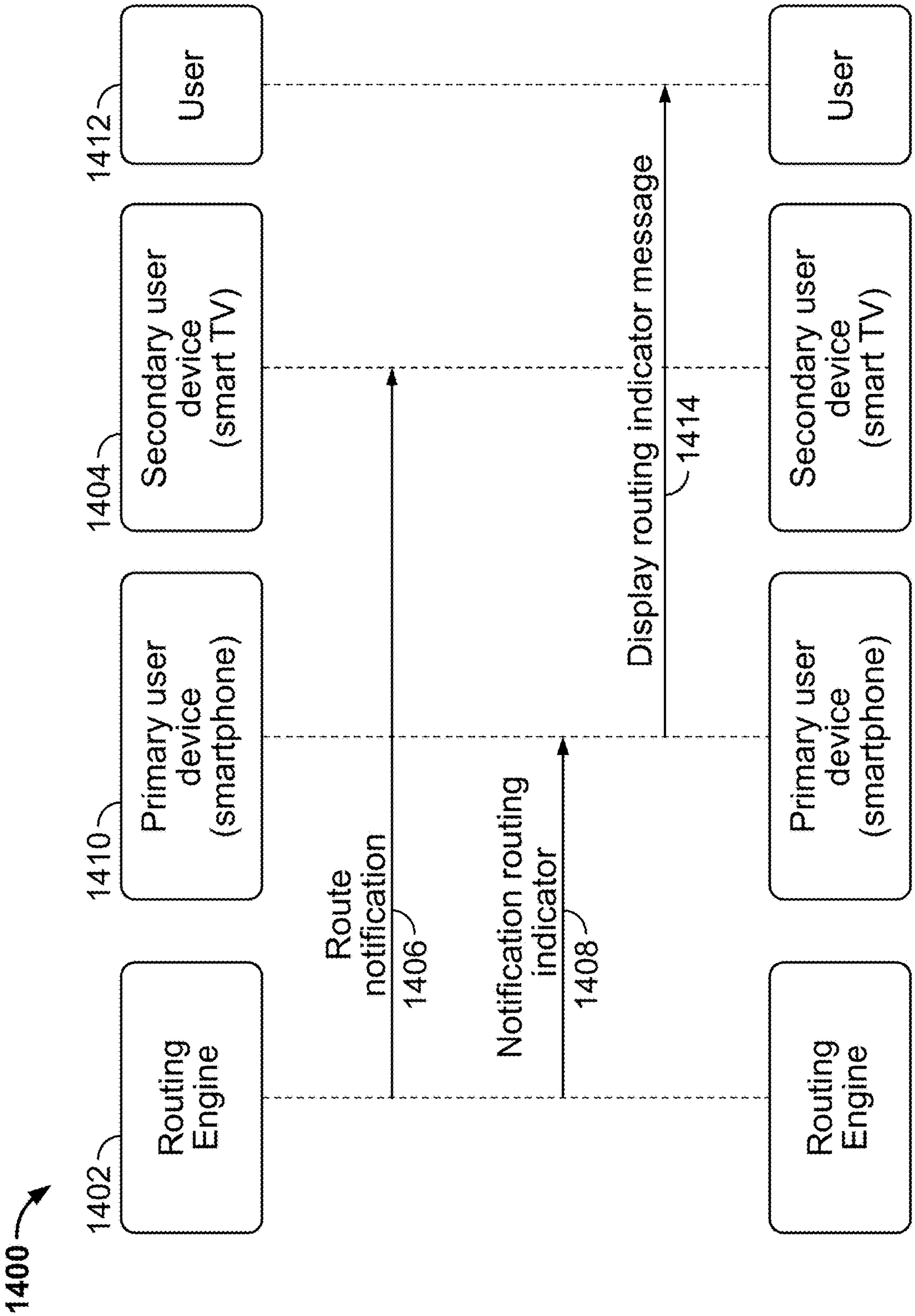
FIG. 14 shows a sequence diagram illustrating a ninth sequence of steps that may be incorporated as part of contextual notification routing in accordance with some embodiments of this disclosure.

The sequence 1400 of FIG. 14 illustrates how notifications may be routed to one user device while another user device indicates to the user that notifications are being routed to the other user device. This sequence 1400 may occur at any time during the process of the notification service collecting real-time user interaction data. The sequence 1400 begins with the routing engine 1402 determining that a notification should be routed to the secondary user device 1404 based on the notification parameters and the routing parameters. The routing engine 1402 routes the notification 1406 to the secondary user device 1404 and routes a notification routing indicator 1408 to the primary user device 1410. In some embodiments, the notification routing indicator 1408 may be in the form of a null notification, which includes instructions configured to instruct the primary user device 1410 to display a routing indicator message 1414 to the user 1412 to indicate that all notifications are presently being routed to the secondary user device 1404. This routing indicator message 1414 may be displayed by the primary user device 1410 until notification routing again includes the primary user device 1410.

Figure 15:
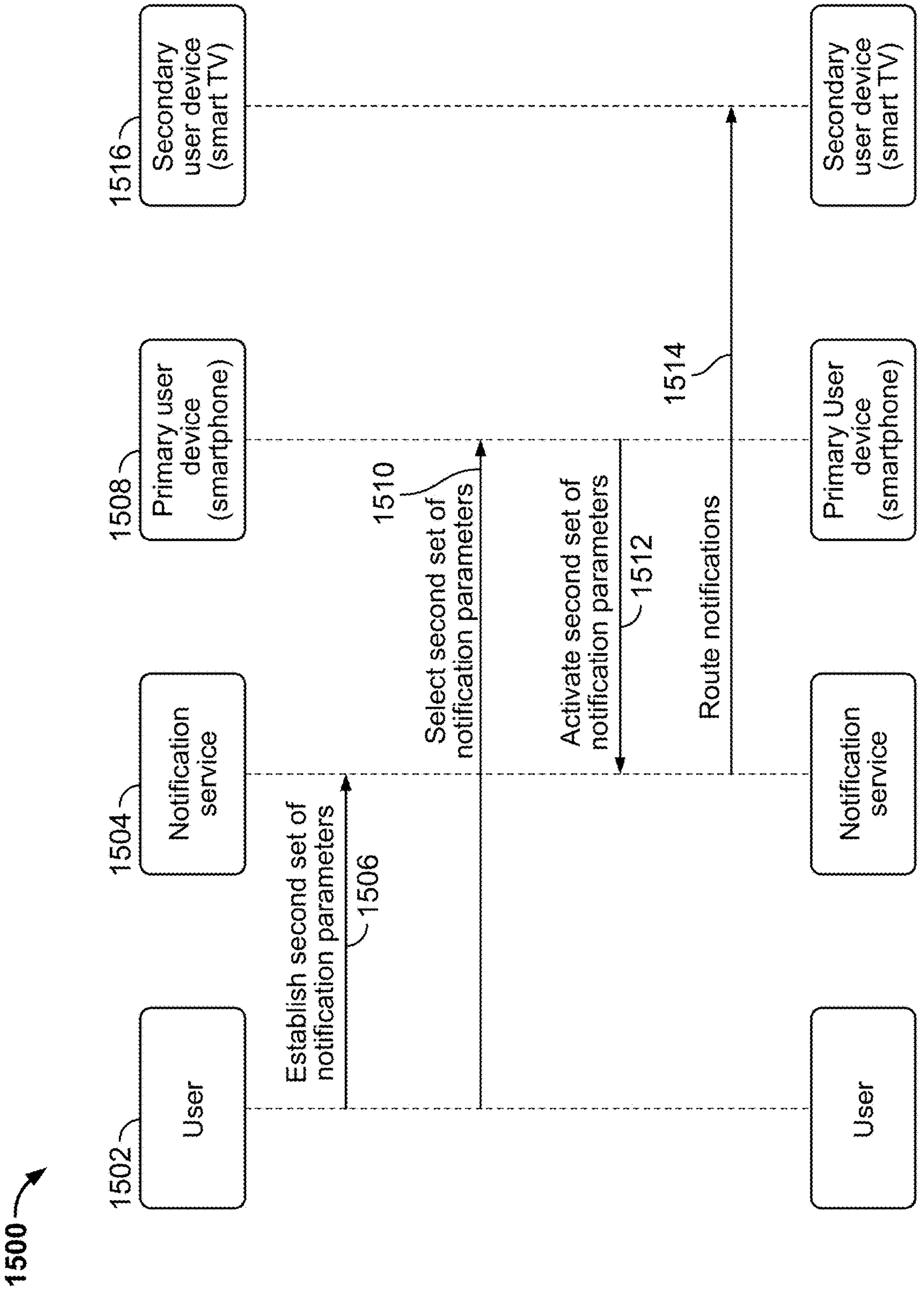
FIG. 15 shows a sequence diagram illustrating a tenth sequence of steps that may be incorporated as part of contextual notification routing in accordance with some embodiments of this disclosure.

The sequence 1500 of FIG. 15 illustrates how the user may establish multiple preconfigured sets of notification parameters and switch between sets of the notification parameters to accommodate different circumstances. This sequence 1500 may occur at any time during the process of the notification service collecting real-time user interaction data after the user 1502 has established the notification account and initial notification parameters. The sequence 1500 begins with the user 1502 interacting with the notification service 1504 to establish a second set of notification parameters 1506. The user 1502 may interact with the notification service 1504 using the primary user device 1508 or any other user device. Once the second set of notification parameters 1506 are established, the user 1502 may select the second set of notification parameters 1510 using the primary user device 1508, and the primary user device 1508 may then communicate with the notification service 1504 to switch to and activate the second set of notification parameters 1512.

The second set of notification parameters 1506 may be for any purpose the user desires. Such a second set of notification parameters may cause all notifications to be routed 1514 to the secondary user device 1516 only, may allow only certain notifications to be routed to a selected device while other notifications are delayed for a predetermined time (e.g., an absolute time, until the end of a calendar event, until a movie is finished playing, until a game application is no longer active, until the user leaves the current location, and the like), may delay all notifications, except highly time-sensitive notifications, until the user switches to a different set of notification parameters, among other options without limitation. The notification service 1504 may provide highly configurable options to the user 1502 for determining when to switch sets of notification parameters, including time options, event options, device activity options, device location options, and device proximity options, among others. By way of example, the user 1502 may establish a focus set of notification parameters that is for use while the user watches media content on the secondary user device 1516, which may be a smart TV. Having a focus set of notification parameters allows the user to quickly switch from the default set to the focus set of notification parameters by accessing the notification service 1504 via the primary user device 1508. The focus set of notification parameters may direct notifications from select application services to the secondary user device while delaying routing of all other notifications. The user 1502 may activate the focus set of notification parameters with an option to switch back to the default set of notification parameters when the secondary user device 1514. As an example for automatic activation of the focus set of notification parameters, the user may configure the focus set of notification parameters to activate when the notification service 1504 determines that the primary user device 1508 is in the same room as the secondary user device 1514, when the primary user device 1508 has not had any user interaction for a predetermined amount of time (e.g., 5 minutes), and the secondary user device 1514 is displaying media content.

Figure 16:
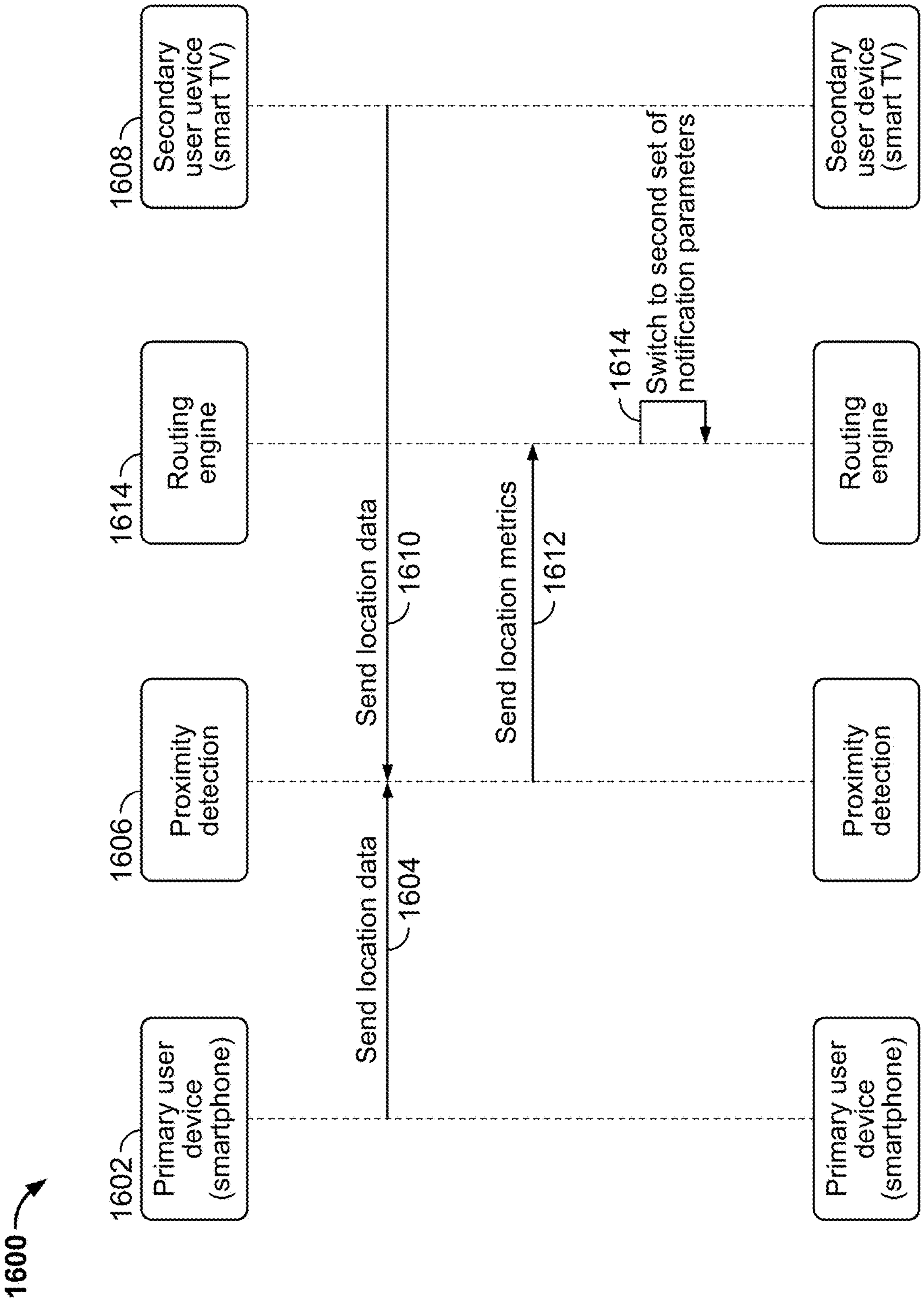
FIG. 16 shows a sequence diagram illustrating an eleventh sequence of steps that may be incorporated as part of contextual notification routing in accordance with some embodiments of this disclosure.

The sequence 1600 of FIG. 16 illustrates how the user may use preconfigured sets of notification parameters and switch between sets of notification parameters to accommodate different circumstances. This sequence 1600 may occur at any time during the process of the notification service collecting real-time user interaction data after the user 1602 has established the notification account and at least two sets of notification parameters. The sequence 1600 begins with the primary user device 1602, which in this instance may be a smartphone, sending location data 1604 to the proximity detection module 1606 and the secondary user device 1608 which in this instance may be a smart TV, sending location data 1610 to the proximity detection module 1606. The proximity detection module 1606 analyzes the location data received from both the primary user device 1602 and the secondary user device 1608 to generate location metrics, and the proximity detection module 1606 sends the location metrics 1612 to the routing engine 1614. In this sequence 1600, when the routing engine 1614 determines that the primary user device 1602 is not in close proximity to the secondary user device 1608, the routing engine 1614 bases routing determinations on a default set of notification parameters. However, when the routing engine 1614 determines that the primary user device 1602 is in close proximity to the secondary user device 1608, the routing engine 1614 automatically switches to a second set of notification parameters 1614 and bases routing determinations on the second set of notification parameters.

In some embodiments, the second set of notification parameters may also provide the user with control over notifications on the secondary user device 1608 via input at the primary user device 1602 when the two user devices 1602, 1608 are in or near predetermined proximity. The input may be effectuated via gestures, voice commands, or other interactions between the user and the primary user device 1602. The predetermined proximity may be determined from the two user devices 1602, 1608 being within, or in some cases near, the same pre-defined home zone, which in some instances may be the user's home, office, or other location. In some embodiments, when the primary user device 1602 is detected as being near or entering the home zone, the notification service may automatically switch to and activate the second set of notification parameters. In some embodiments, the control over notifications on the secondary user device 1608 may be implemented using null notifications, which may be configured to include instructions to the secondary user device 1608, the instructions configured to instruct the secondary user device 1608 to perform actions, such as dismissing notifications on the secondary user device 1608.

In some embodiments, switching from one set of notification parameters to a second set of notification parameters may occur automatically when the primary user device 1602 leaves the home zone. In such embodiments, the second set of notification parameters may be implemented to minimize or turn off notifications to the secondary user device 1608. Such an embodiment may ensure that notifications do not continue to be displayed on the secondary user device 1608 to potentially display sensitive or personal information when the user is not around to engage with and dismiss the notifications.

Figure 17:
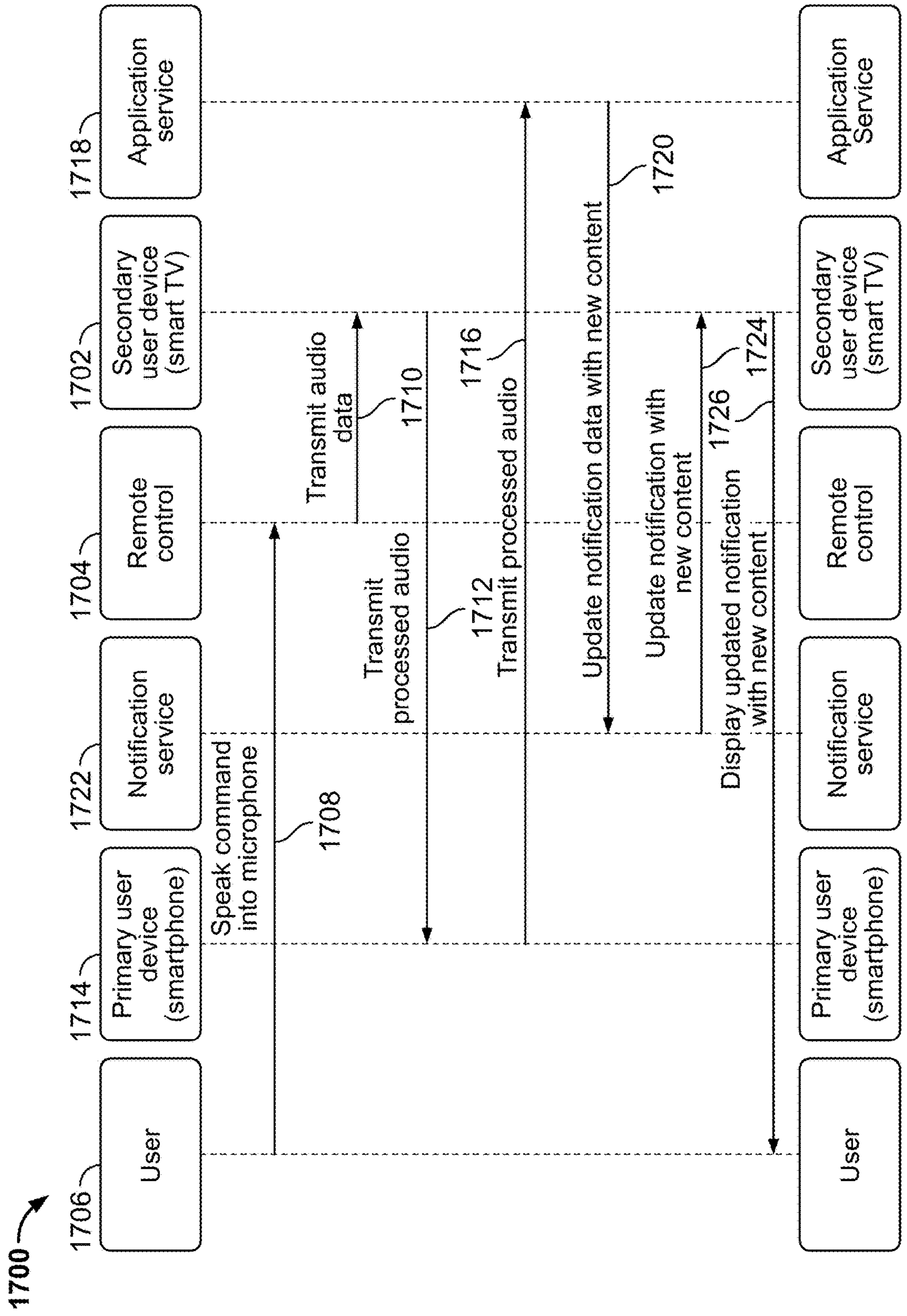
FIG. 17 shows a sequence diagram illustrating a twelfth sequence of steps that may be incorporated as part of contextual notification routing in accordance with some embodiments of this disclosure.

The sequence 1700 of FIG. 17 illustrates how the user may interact with notifications using audio input on a user device that does not have the application installed that is associated with the notification. This sequence 1700 may occur at any time during the process of the notification service collecting real-time user interaction data. The sequence 1700 begins after a notification has been displayed on a secondary user device 1702. The secondary user device 1702 is associated with a remote control 1704 which includes audio input capabilities through a microphone. During use, a button may be pressed on the remote control 1704 to activate the microphone for recording the user's voice. In this sequence 1700, when a notification is displayed on the secondary user device 1702, the user 1706 may interact with the notification via the microphone included with the remote control 1704. This interaction starts with the user 1706 pressing the button on the remote control 1704 to activate the microphone and then speaking into the microphone 1708 to generate audio data. The remote control 1704 transmits the audio data 1710 to the secondary user device 1702, which then processes the audio data 1710. The secondary user device transmits the processed audio data 1712 to the primary user device 1714, which in turn transmits the processed audio data 1716 to the application service 1718 associated with the notification displayed on the secondary user device 1702. In response to receiving and processing the processed audio data 1716, the application service 1718 may transmit updated notification data with new content 1720 to the notification service 1722. The notification service 1722 may then send an updated notification with the new content 1724 to the secondary user device 1702, and the secondary user device 1702 may display the updated notification 1726 to the user 1706. Through this sequence 1700, the primary user device 1714 assists the secondary user device 1702 with responding to a notification using a recorded audio response. This assistance allows the user 1706 to have real-time interactions with the notification, via audio input, on the secondary user device 1702 even if the application associated with the notification is not installed on the secondary user device 1702. The user 1706 therefore need not disengage from the secondary user device 1702 in order to engage with the notification.

The processes and systems described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of notification routing comprising:

establishing notification parameters for a notification account, the notification account associated with a plurality of user devices;

receiving, via input/output circuitry, real-time device status data from at least one user device of the plurality of user devices, the real-time device status data based on real-time user interaction with the at least one user device;

determining, using control circuitry, routing parameters based on the real-time device status data;

receiving, via the input/output circuitry, notification data from an application service for the notification account;

generating, using the control circuitry, a notification based on the notification data;

identifying, using the control circuitry, one or more recipient user devices from among the plurality of user devices based on the notification parameters and the routing parameters; and routing, using the control circuitry and the input/output circuitry, a notification to the identified one or more recipient user devices.

2. The method of claim 1, wherein establishing the notification parameters comprises receiving, via the input/output circuitry, the notification parameters from a first user device of the plurality of user devices.

3. The method of claim 1, wherein establishing the notification parameters comprises establishing the notification parameters based on user-selected preferences.

4. The method of claim 1, wherein the real-time device status data comprises proximity data that indicates whether a first user device of the plurality of user devices and a second user device of the plurality of user devices are in a predetermined physical proximity.

5. The method of claim 4, wherein identifying the one or more recipient user devices comprises identifying the one or more recipient user devices to include one of the first user device and the second user device when the first user device and the second user device are in the predetermined physical proximity.

6. The method of claim 4, wherein identifying the one or more recipient user devices comprises identifying the one or more recipient user devices to include one of the first user device and the second user device when the first user device and the second user device leave the predetermined physical proximity.

7. The method of claim 4, further comprising:

communicating, via the input/output circuitry, a notification dismissal to the second user device when the first user device and the second user device enter the predetermined physical proximity, the notification dismissal configured to instruct the second user device to dismiss the routed notification.

8. The method of claim 1, the identified one or more recipient user devices comprising a first user device and a second user device, the method further comprising:

receiving, via the input/output circuitry, notification dismissal data from the first user device, the notification dismissal data associated with the routed notification; and communicating, via the input/output circuitry, a notification dismissal to the second user device, the notification dismissal configured to instruct the second user device to dismiss the routed notification.

9. The method of claim 1, wherein:

receiving the real-time device status data comprises receiving updated real-time device status data from the at least one user device; and determining the routing parameters comprises updating the routing parameters based on the updated real-time device status data.

10. The method of claim 1, wherein generating the notification comprises generating the notification to include device control instructions, the device control instructions configured to instruct a first user device of the plurality of user devices to display the notification and to instruct a second user device of the plurality of user devices to pause display of content.

11. The method of claim 1, wherein:

receiving the notification data comprises receiving the notification data comprising a content source location identifier; and generating the notification comprises generating the notification to include the content source location identifier and instructions configured to instruct the one or more recipient user devices to retrieve content using the content source location identifier and to display the retrieved content as part of displaying the notification.

12. The method of claim 11, wherein the content source location identifier identifies content stored on a first user device of the plurality of user devices.

13. The method of claim 1, wherein:

receiving the notification data comprises receiving the notification data comprising a content source location identifier;

generating the notification comprises generating a first notification and a second notification, the first notification comprising the content source location identifier and first instructions to a first user device of the one or more recipient user devices to retrieve and store content using the content source location identifier, and the second notification comprising second instructions to a second user device of the one or more recipient user devices to retrieve the content from the first user device; and routing the notification comprises routing the first notification to the first user device and routing the second notification to the second user device.

14. The method of claim 1, wherein:

generating the notification comprises generating a first notification comprising first instructions configured to instruct a first user device of the one or more recipient user devices to stream content to a second user device of the one or more recipient user devices, and the second notification comprising second instructions configured to instruct the second user device to receive and display the streamed content as part of displaying the second notification; and routing the notification comprises routing the first notification to the first user device and routing the second notification to the second user device.

15. The method of claim 14, wherein the notification data comprises a content source location identifier and the first instructions are further configured to instruct the first user device to retrieve the content using the content source location identifier.

16. The method of claim 1, wherein a first user device of the plurality of user devices comprises the control circuitry and the input/output circuitry.

17. The method of claim 1, wherein a cloud service comprises the control circuitry and the input/output circuitry.

18. A notification routing system comprising:

input/output circuitry;

control circuitry configured to:

establish notification parameters for a notification account, the notification account associated with a plurality of user devices;

receive, via the input/output circuitry, real-time device status data from at least one user device of the plurality of user devices, the real-time device status data based on real-time user interaction with the at least one user device;

determine routing parameters based on the real-time device status data;

receive, via the input/output circuitry, notification data from an application service for the notification account;

generate a notification based on the notification data;

identify one or more recipient user devices from among the plurality of user devices based on the notification parameters and the routing parameters; and routing, using the input/output circuitry, a notification to the identified one or more recipient user devices.

19. The system of claim 18, wherein the control circuitry is further configured to establish the notification parameters by receiving, via the input/output circuitry, the notification parameters from a first user device of the plurality of user devices.

20. The system of claim 18, wherein the control circuitry is further configured to establish the notification parameters based on user-selected preferences.

* * * * *